United States Patent
Saito

(10) Patent No.: US 8,896,930 B2
(45) Date of Patent: Nov. 25, 2014

(54) ZOOM LENS AND IMAGE PICKUP APPARATUS EQUIPPED WITH ZOOM LENS

(75) Inventor: Shinichiro Saito, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 353 days.

(21) Appl. No.: 13/493,811

(22) Filed: Jun. 11, 2012

(65) Prior Publication Data
US 2012/0320251 A1 Dec. 20, 2012

(30) Foreign Application Priority Data

Jun. 14, 2011 (JP) ................... 2011-132020

(51) Int. Cl.
*G02B 15/16* (2006.01)
*G02B 15/173* (2006.01)
*G02B 27/64* (2006.01)
*G03B 5/00* (2006.01)

(52) U.S. Cl.
CPC .............. *G02B 15/173* (2013.01); *G02B 15/16* (2013.01); *G02B 27/646* (2013.01); *G03B 5/00* (2013.01); *G03B 2205/0015* (2013.01); *G03B 2205/0046* (2013.01)
USPC .......................................... 359/683; 359/557

(58) Field of Classification Search
CPC ...... G02B 15/15; G02B 15/16; G02B 15/163; G02B 15/167; G02B 15/173
USPC .................................................. 359/683, 557
See application file for complete search history.

(56) References Cited

U.S. PATENT DOCUMENTS

| | | | |
|---|---|---|---|
| 6,094,312 A | 7/2000 | Nakayama | |
| 7,525,729 B2 | 4/2009 | Suzaki | |
| 7,609,460 B2* | 10/2009 | Suzaki et al. | 359/764 |
| 7,652,688 B2 | 1/2010 | Kuroda | |
| 7,894,135 B2 | 2/2011 | Nanba | |
| 7,990,623 B2* | 8/2011 | Hatakeyama et al. | 359/683 |
| 7,995,284 B2* | 8/2011 | Matsui | 359/683 |

* cited by examiner

*Primary Examiner* — Zachary Wilkes
(74) *Attorney, Agent, or Firm* — Canon USA Inc IP Division

(57) ABSTRACT

A zoom lens includes, in order from an object side to an image side, a first lens unit of a positive refractive power, a second lens unit of a negative refractive power, a third lens unit of a positive refractive power, a fourth lens unit of a positive refractive power, and a fifth lens unit, the second and fourth lens units being moved during zooming, a distance between the first and second lens units increasing at a telephoto end in comparison with a wide-angle end, wherein the fifth lens unit includes a first lens subunit of a negative refractive power, and a second lens subunit of a positive refractive power, the first lens subunit is moved to have a component perpendicular to an optical axis to change an image-forming position, and a condition $0.5<|(1-\beta5n)\times\beta5p|<2.0$ is satisfied.

10 Claims, 20 Drawing Sheets

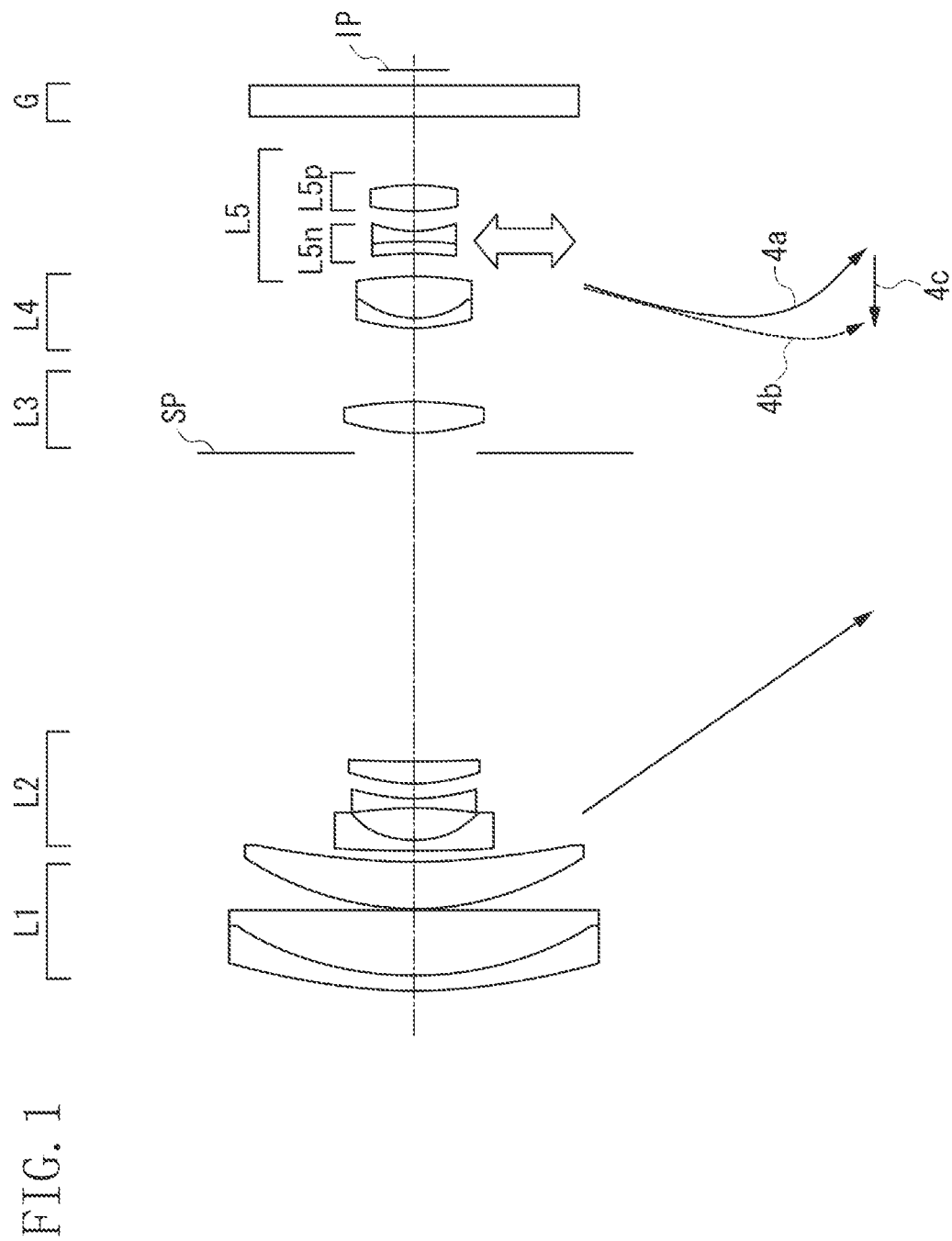

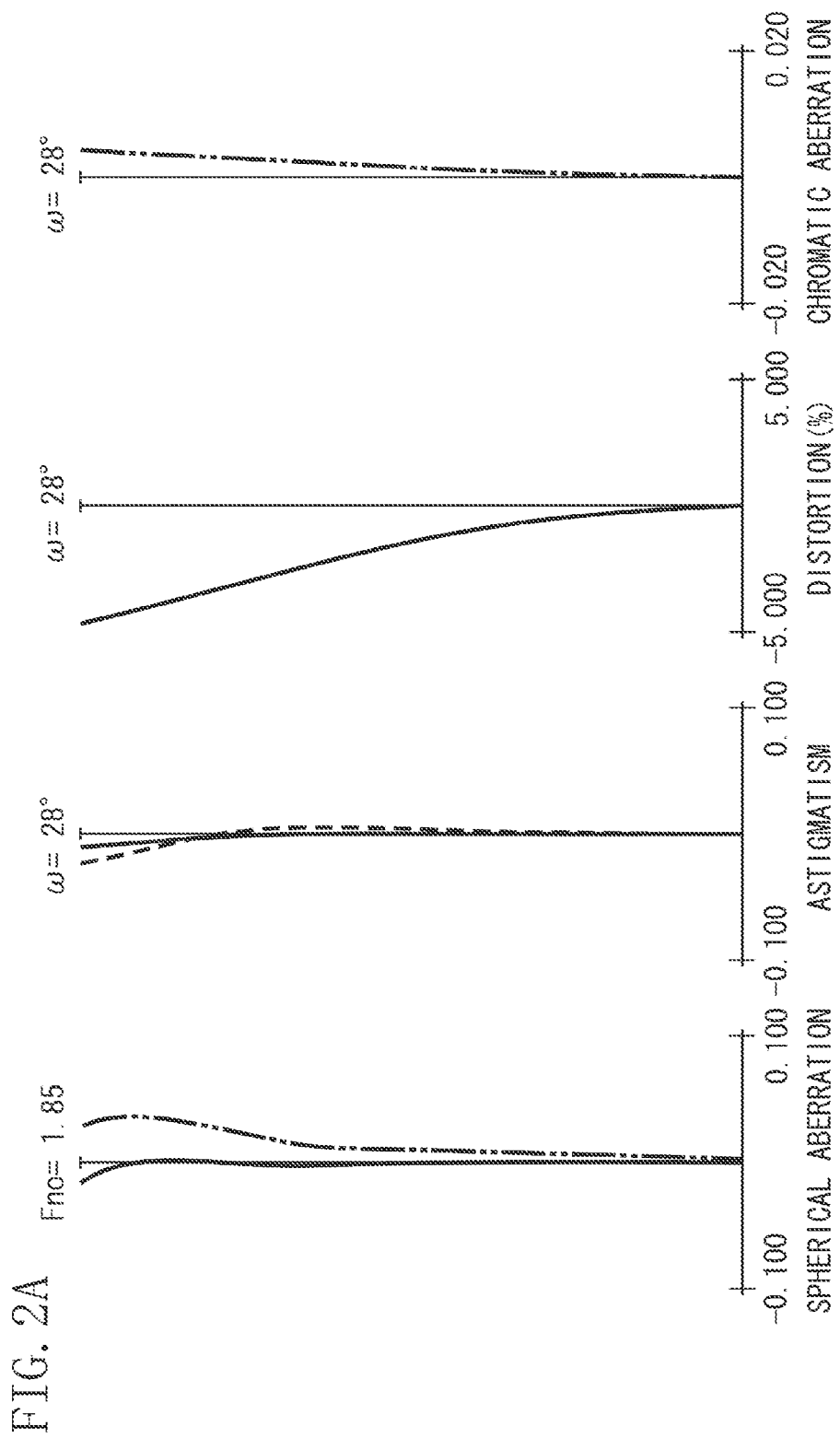

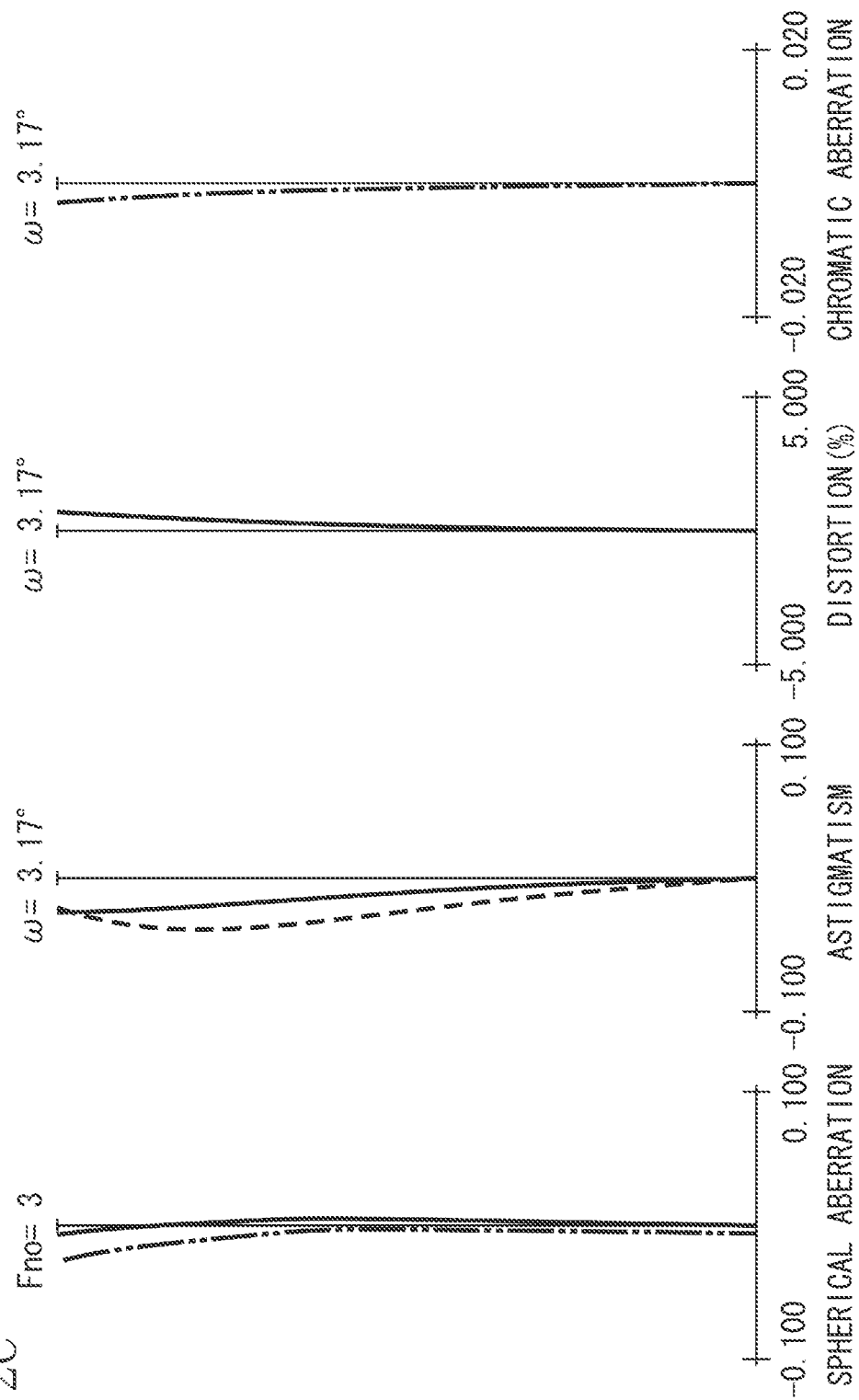

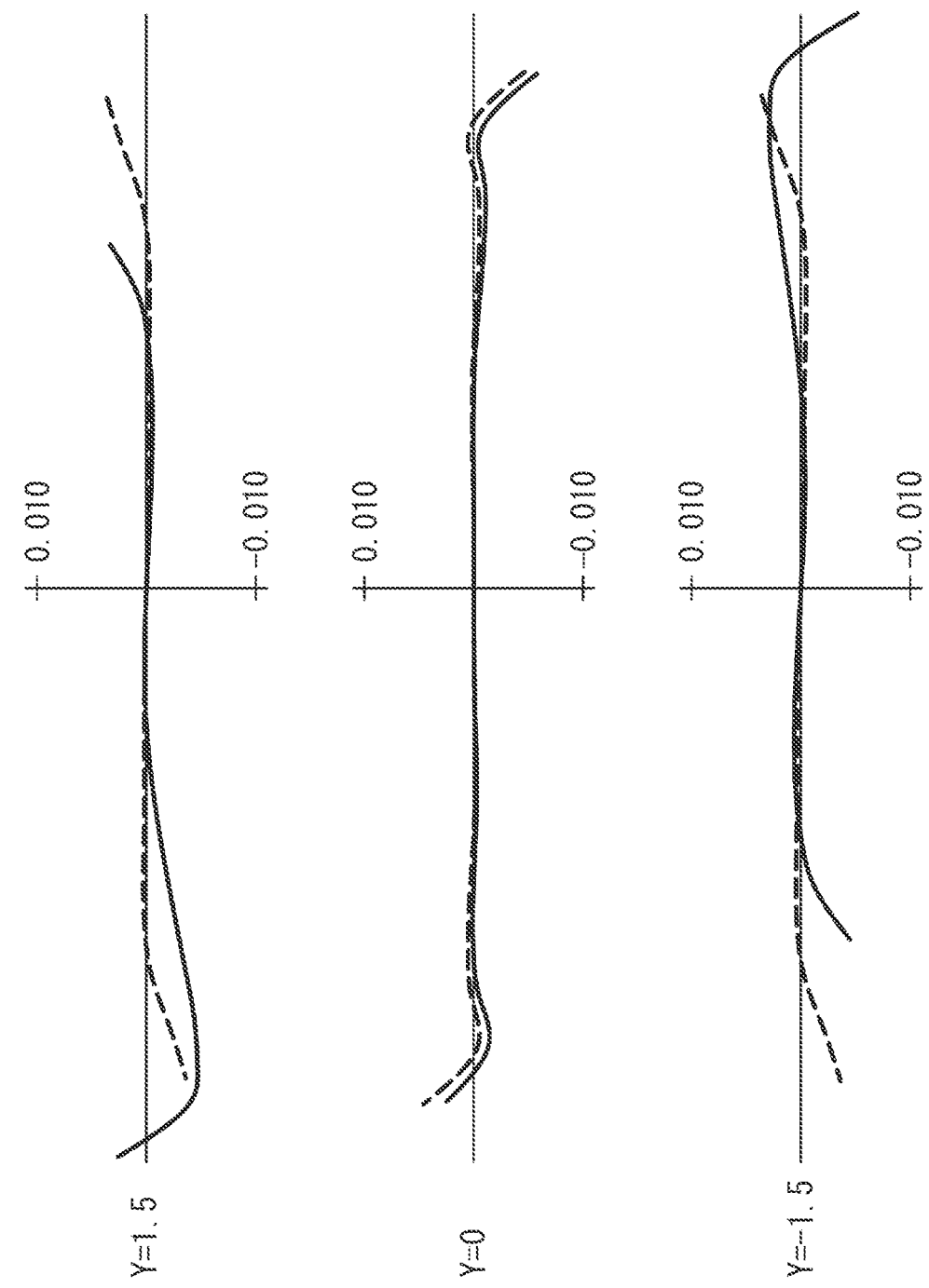

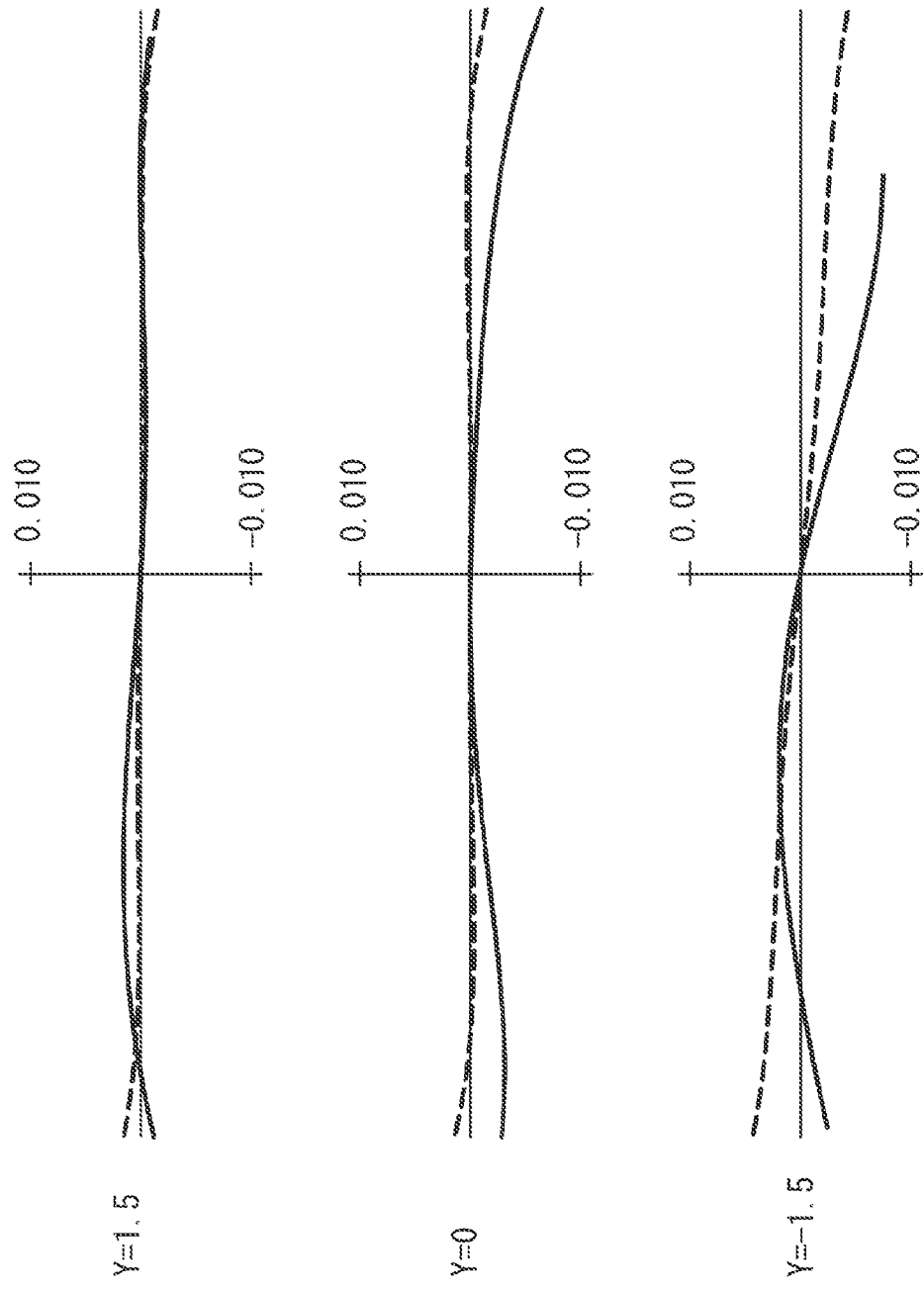

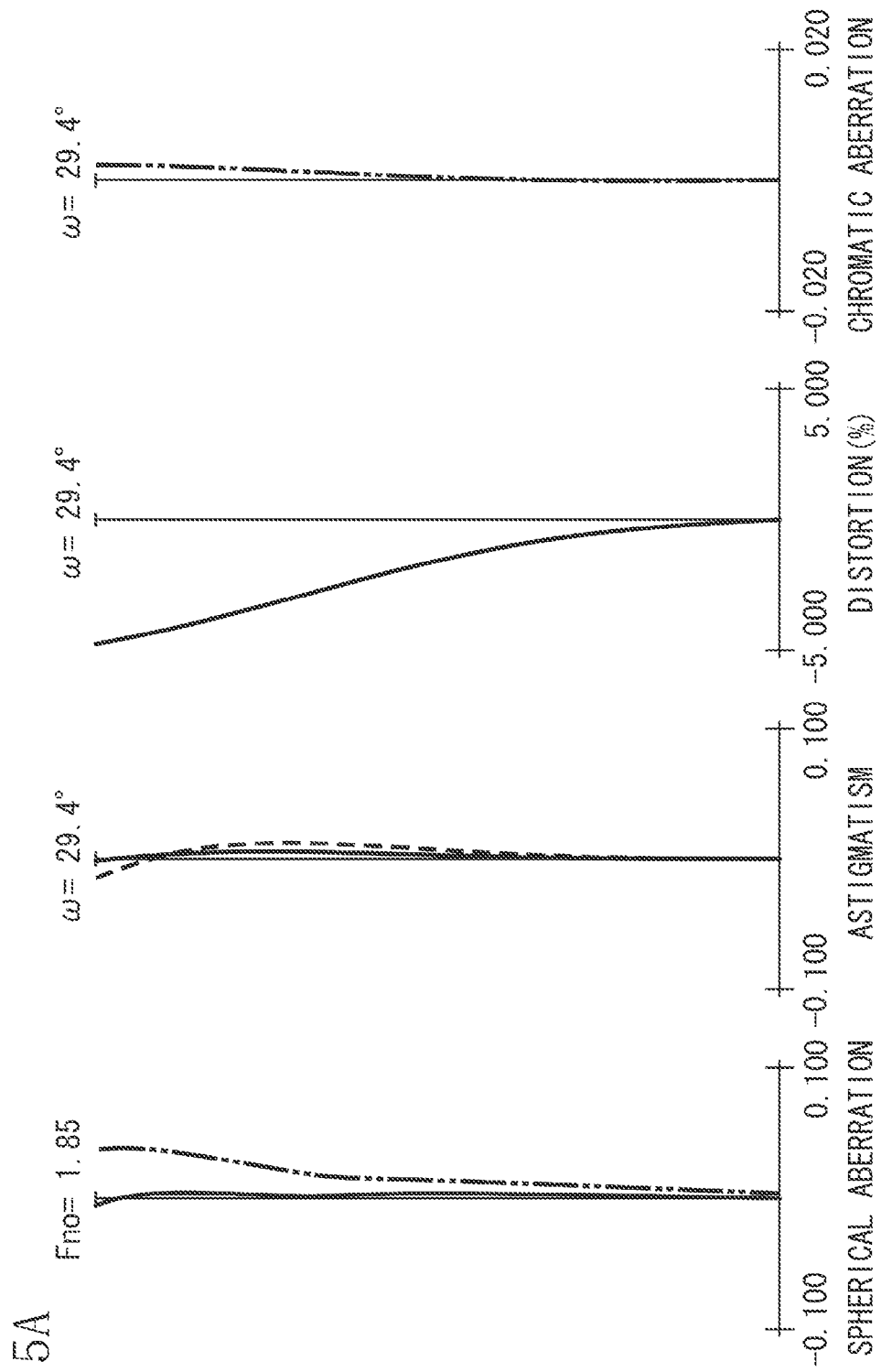

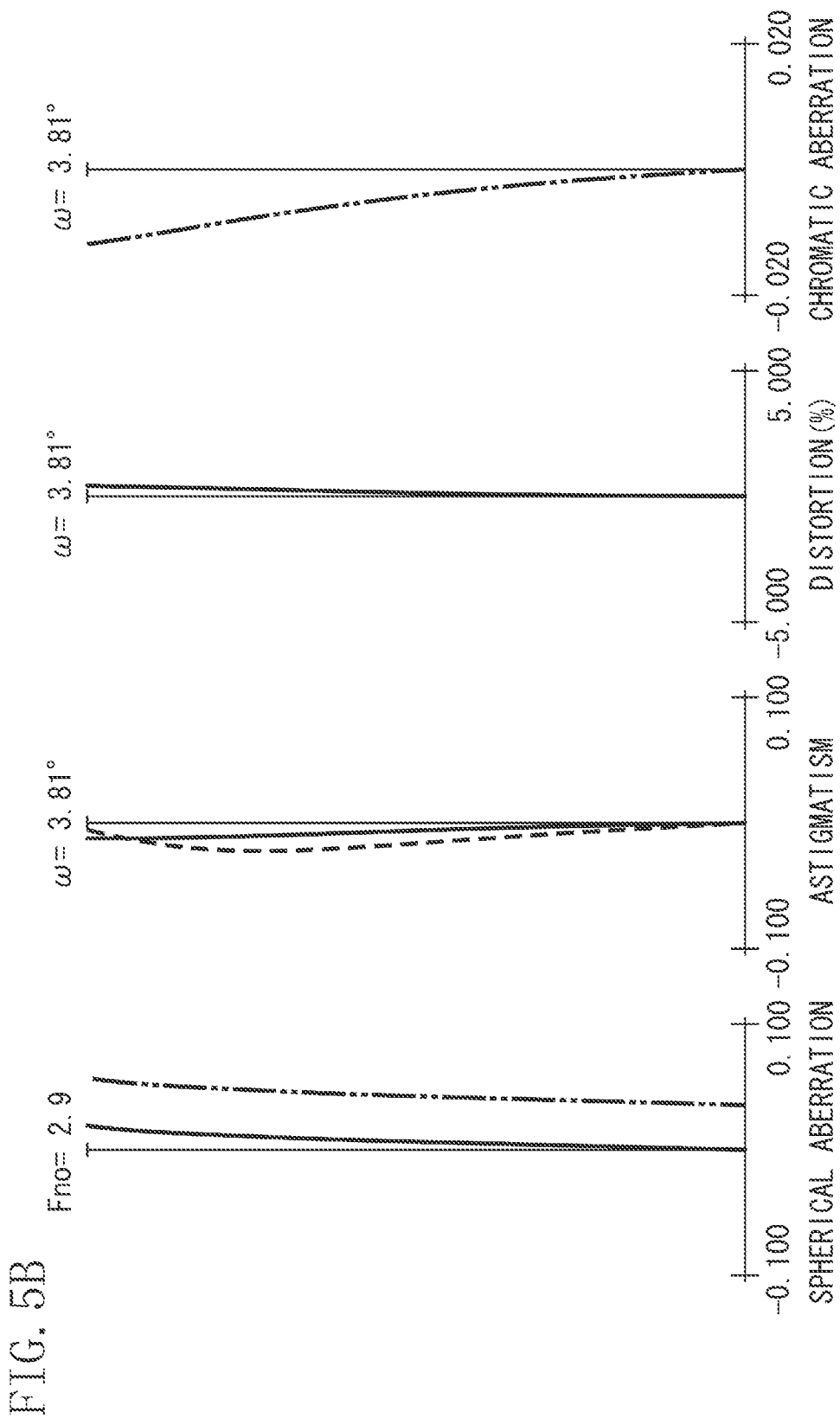

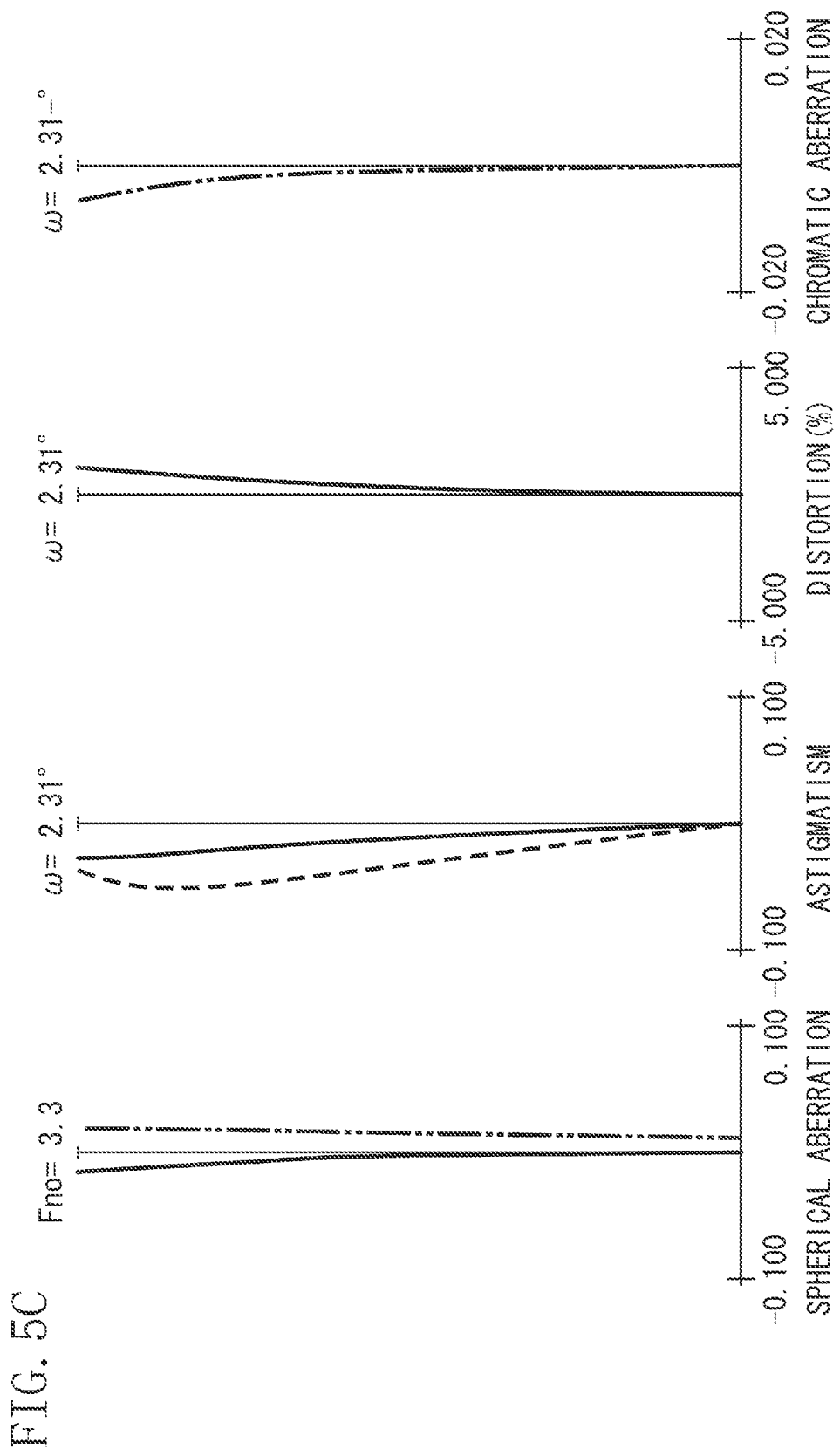

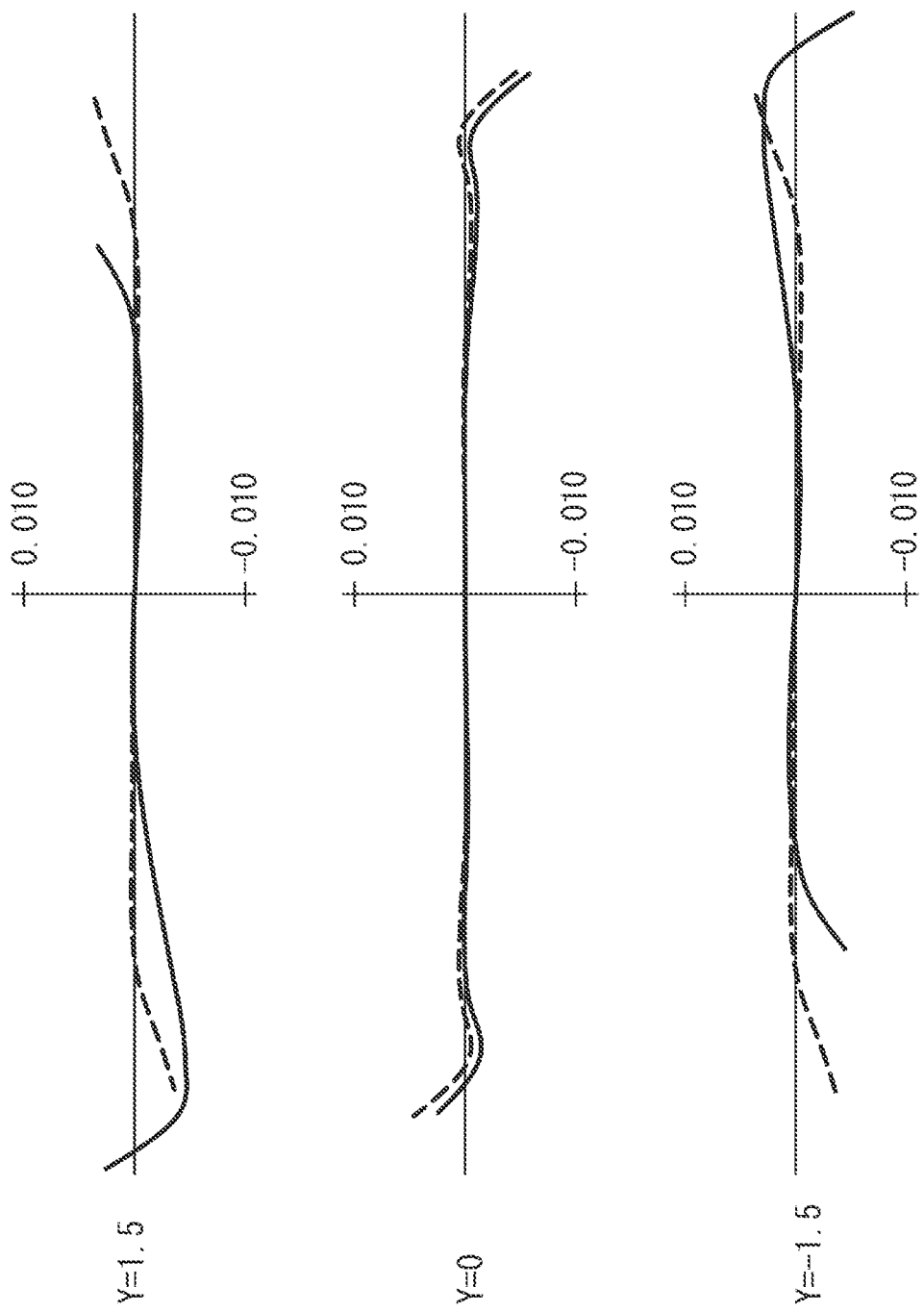

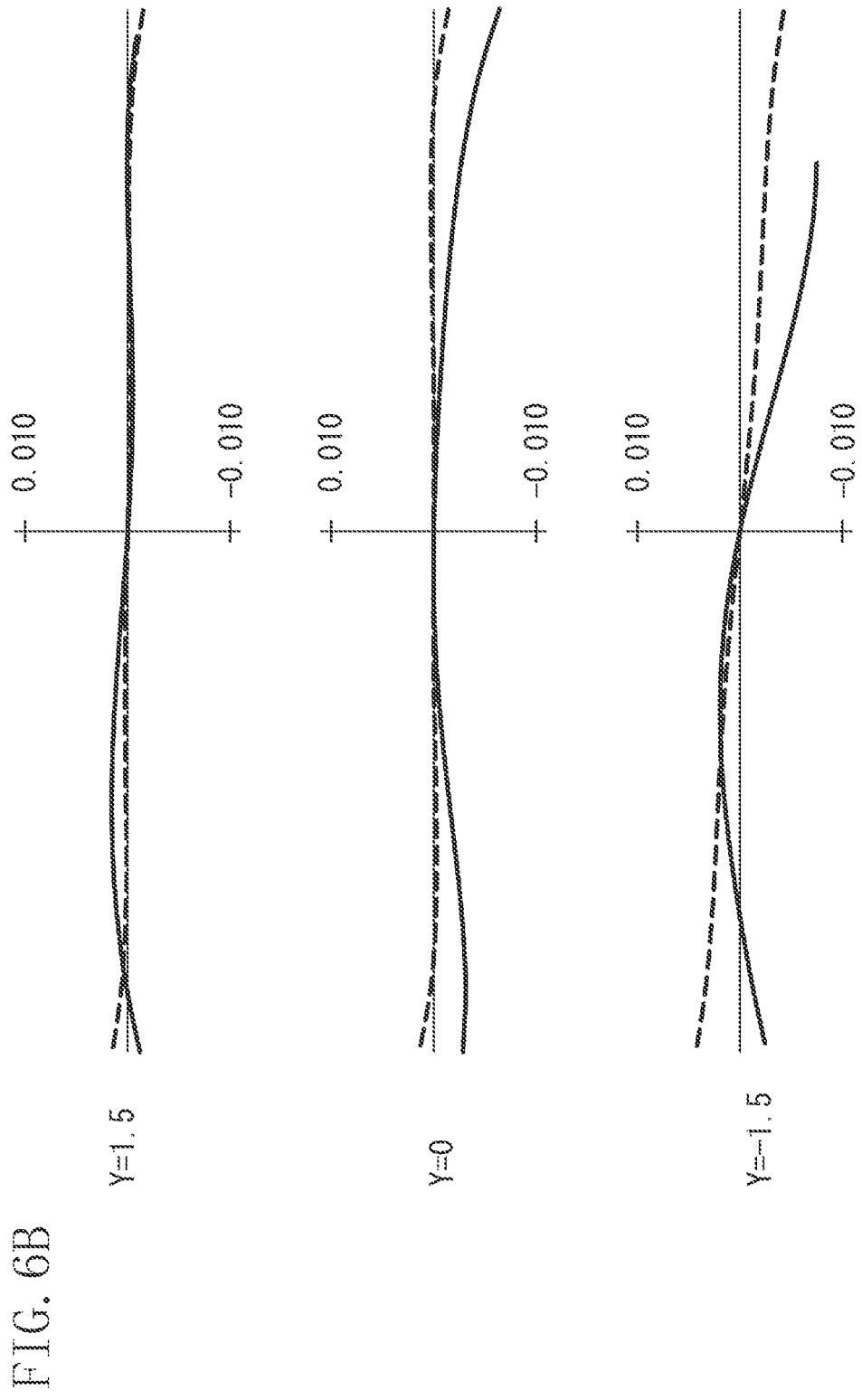

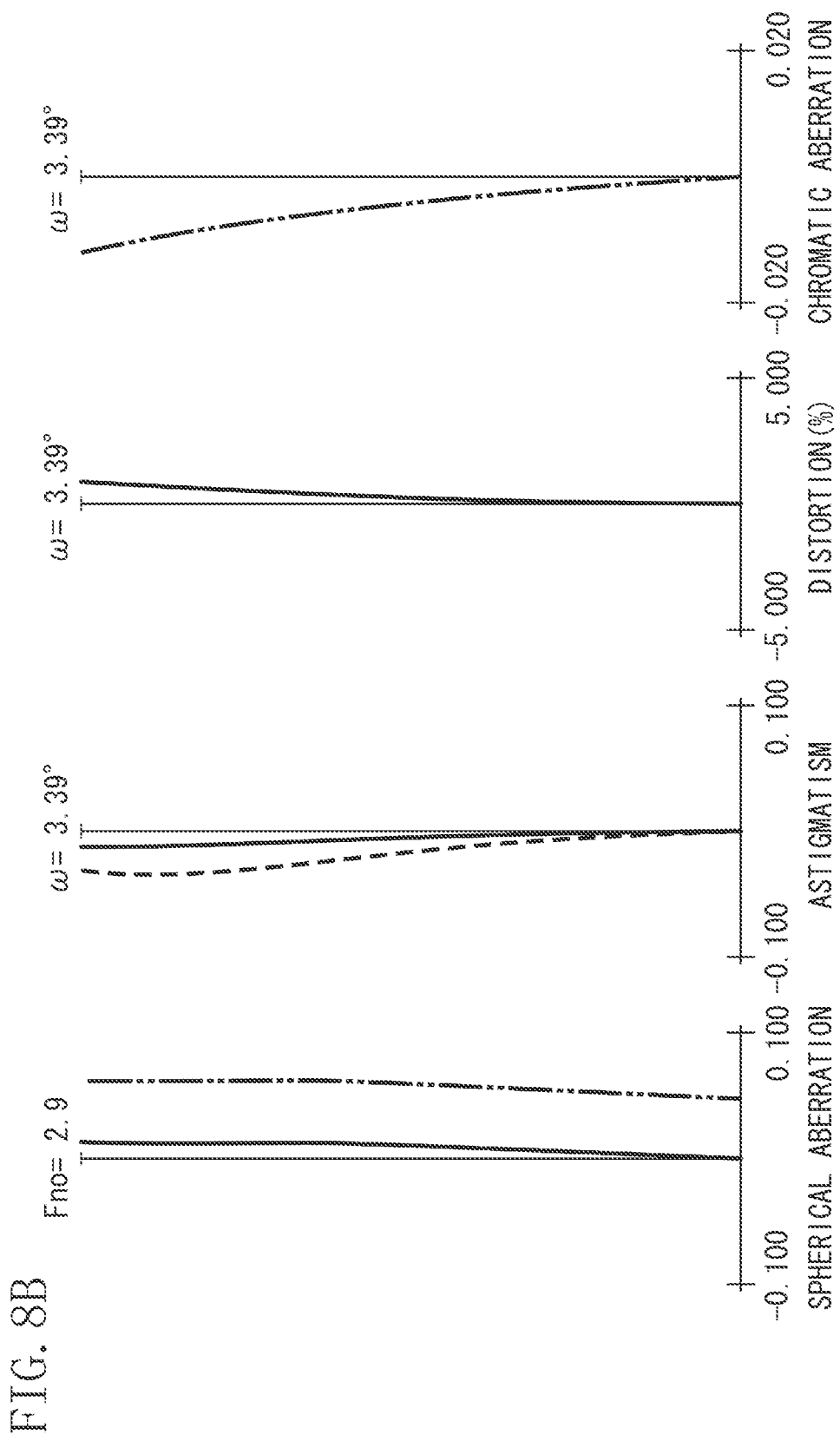

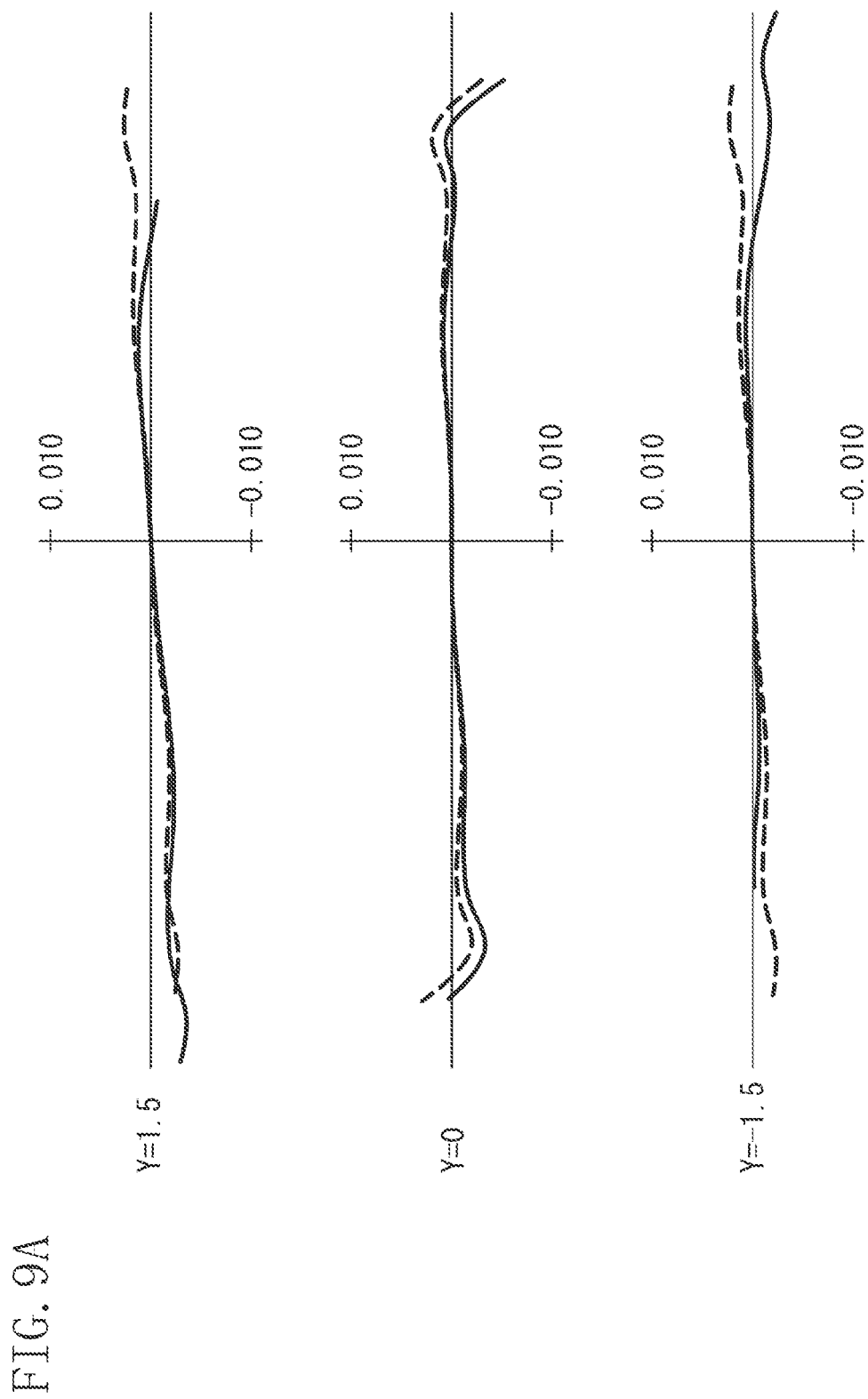

ZOOM LENS AND IMAGE PICKUP APPARATUS EQUIPPED WITH ZOOM LENS

BACKGROUND OF THE INVENTION

1. Field of the Invention

The invention relates to a zoom lens and an image pickup apparatus equipped with the zoom lens, and more particularly, to a zoom lens suitable for an image pickup apparatus using a solid-state image sensor such as a video camera, an electronic still camera, a broadcasting camera, and a monitoring camera or an image pickup apparatus such as a silver-halide film camera.

2. Description of the Related Art

In recent years, in a photographic optical system used in an image pickup apparatus using a solid-state image sensor, there is a demand for a zoom lens having a miniaturized size with a high zoom ratio and a high resolution. In addition, there is a demand for an image-stabilizing mechanism for compensating for an image shake generated when accidental vibration such as a camera shake is transferred to the zoom lens. Particularly, when correction is made by moving a correction lens unit for image shake correction in a direction perpendicular to an optical axis, the correction lens unit is required to have a small size and a light weight to miniaturize the image-stabilizing mechanism and save power. Furthermore, there is a demand for a photographic optical system that experiences little variation of aberration during the image shake correction and maintains excellent optical performance during the image stabilization.

There is known a positive lead type zoom lens in which a lens unit of a positive refractive power is arranged closest to an object side with an image-stabilizing function.

U.S. Pat. No. 7,894,135 discusses a five-unit zoom lens including first to fifth lens units of positive, negative, positive, negative, and positive refractive powers, respectively, in order from an object side to an image side, in which the fourth lens unit includes a single component, and image shake correction is performed.

U.S. Pat. No. 7,525,729 discusses a five-unit zoom lens including first to fifth lens units of positive, negative, positive, positive, and positive refractive powers, respectively, in order from an object side to an image side, in which the fifth lens unit includes three lens sub-units, and image shake correction is performed using a part of the lens sub-units.

U.S. Pat. No. 7,652,688 discusses a five-unit zoom lens including first to fifth lens units of positive, negative, positive, positive, and negative refractive power, respectively, in order from an object side to an image side, in which the fifth lens unit includes two lens sub-units, and image shake correction is performed using a part of the lens sub-units.

In addition, there is known a rear focus type zoom lens in which focusing is performed by moving a lens unit other than an object-side first lens unit to miniaturize the entire zoom lens.

U.S. Pat. No. 6,094,312 discusses a zoom lens including first to fifth lens units of positive, negative, positive, negative, and positive refractive powers in order from an object side to an image side, in which zooming is performed by moving the second lens unit, and focusing is performed while an image plane variation caused by the zooming is corrected by moving the fourth lens unit.

The image shake can be corrected relatively easily using a zoom lens in which a part of the lens units thereof is used as an image-stabilizing lens unit, and they are decentered in parallel to the direction perpendicular to the optical axis to perform the image shake correction. However, if a high zoom ratio is to be obtained while a configuration of the zoom lens and a configuration of the image-stabilizing lens unit moved for image stabilization are not appropriate, a large amount of decentering aberration is generated during image stabilization, so that optical performance is significantly degraded. For this reason, in a zoom lens having an image-stabilizing function with a high zoom ratio, it is important to appropriately set a configuration of the entire lens or a configuration of the lens unit included in the correction lens unit for image stabilization.

For example, it is important to appropriately set a refractive power and an image-forming magnification of the image-stabilizing lens unit, an image-forming magnification of a lens unit located on the image side of the image-stabilizing lens unit, and the like. If such configurations are not appropriately set, it is difficult to miniaturize the entire zoom lens and maintain excellent optical performance during image stabilization with a high zoom ratio.

SUMMARY OF THE INVENTION

Aspects of the present invention are directed to embodiments of a zoom lens having a miniaturized size in entirety and a high zoom ratio and capable of obtaining excellent optical performance even during image stabilization by appropriately correcting an aberration variation for image shake correction.

According to an aspect of the present invention, a zoom lens includes, in order from an object side to an image side, a first lens unit of a positive refractive power, a second lens unit of a negative refractive power, a third lens unit of a positive refractive power, a fourth lens unit of a positive refractive power, and a fifth lens unit of a positive or negative refractive power, the second and fourth lens units being moved during zooming, a distance between the first and second lens units increasing at a telephoto end in comparison with a wide-angle end, wherein the fifth lens unit includes a first lens subunit of a negative refractive power, and a second lens subunit of a positive refractive power located on the image side of the first lens subunit, the first lens subunit is moved to have a component perpendicular to an optical axis to change an image-forming position, and a condition $0.5<|(1-\beta 5n)\times\beta 5p|<2.0$ is satisfied, where $\beta 5n$ denotes a lateral magnification of the first lens subunit L5n, and $\beta 5p$ denotes a lateral magnification of the second lens subunit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a lens cross-sectional view illustrating a zoom lens according to a first exemplary embodiment of the invention at the wide-angle end.

FIGS. 2A, 2B, and 2C are aberration charts of the zoom lens according to the first exemplary embodiment at the wide-angle end, the middle zoom position, and the telephoto end, respectively.

FIGS. 3A and 3B are lateral aberration charts of the zoom lens according to the first exemplary embodiment at the wide-angle end and the telephoto end, respectively, afterimage displacement by 0.3°.

FIGS. 5A, 5B, and 5C are aberration charts of the zoom lens according to the second exemplary embodiment of the invention at the wide-angle end, the middle zoom position, and the telephoto end, respectively.

FIGS. 6A and 6B are lateral aberration charts of the zoom lens according to the second exemplary embodiment of the invention at the wide-angle end and the telephoto end, respectively, after image displacement by 0.3°.

FIGS. 8A, 8B, and 8C are aberration charts of the zoom lens according to the third exemplary embodiment of the invention at the wide-angle end, the middle zoom position, and the telephoto end, respectively.

FIGS. 9A and 9B are lateral aberration charts of the zoom lens according to the third exemplary embodiment of the invention at the wide-angle end and the telephoto end, respectively, after image displacement by 0.3°.

DESCRIPTION OF THE EMBODIMENTS

Various exemplary embodiments, features, and aspects of the invention will be described in detail below with reference to the drawings.

A zoom lens according to an exemplary embodiment of the invention includes a first lens unit of a positive refractive power, a second lens unit of a negative refractive power, a third lens unit of a positive refractive power, a fourth lens unit of a positive refractive power, and a fifth lens unit or a positive of negative refractive power in order from an object side to an image side. During zooming, the second and fourth lens units are moved. In this case, the second lens unit has a zoom type in which a distance between the first and second lens units increases at the telephoto end in comparison with at the wide-angle end.

In addition, focusing is performed using the fourth lens unit. The fifth lens unit includes a first lens subunit L5n of a negative refractive power having an image-stabilizing function for performing image displacement, in which the lens subunit L5n is moved to have a component perpendicular to an optical axis. The fifth lens unit L5 includes a second lens subunit L5p of a positive refractive power located on the image side of the first lens subunit L5n.

Figure 2B:
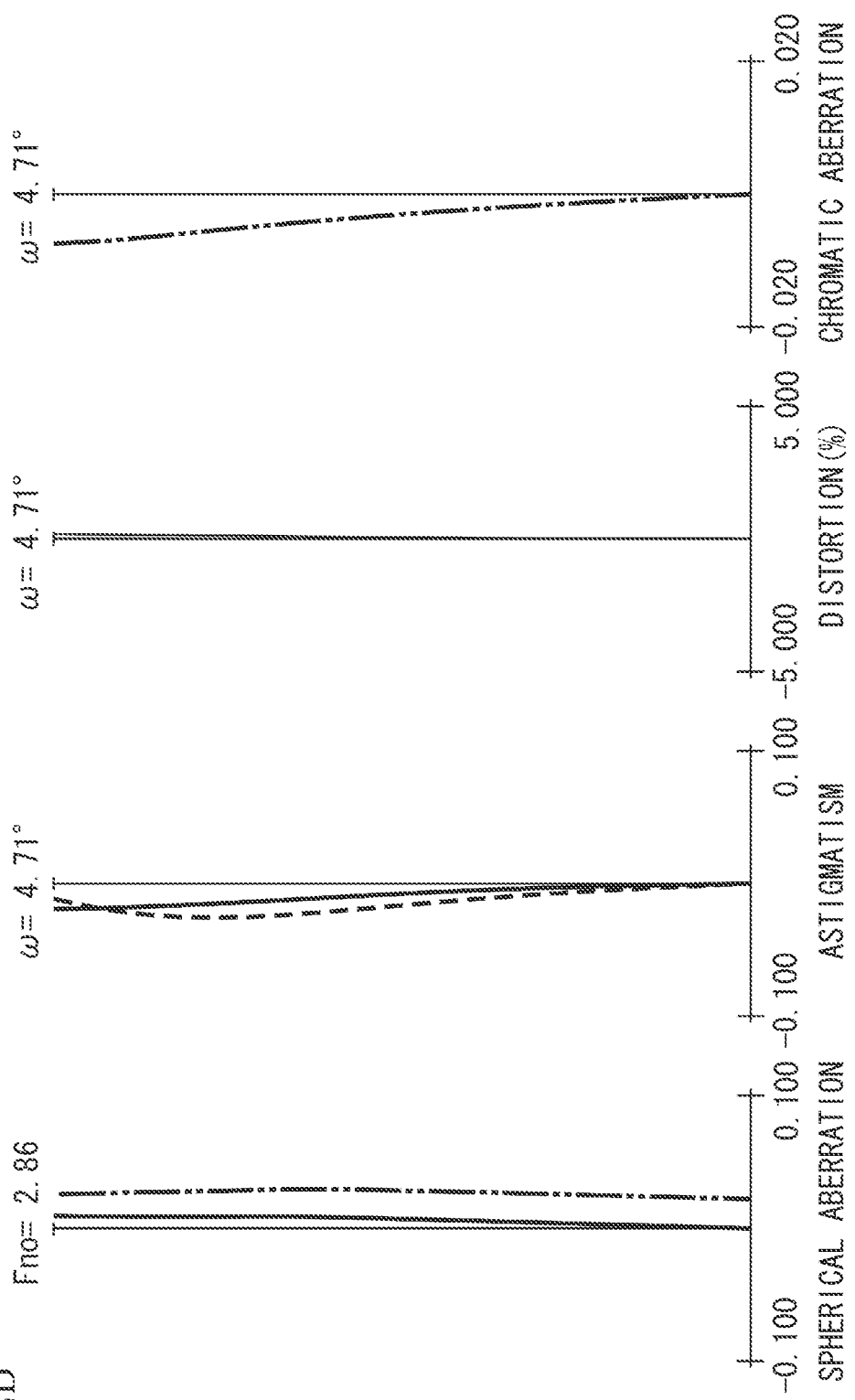

FIG. 1 is a lens cross-sectional view illustrating the zoom lens according to the first exemplary embodiment of the invention at the wide-angle end (short focal length end). FIGS. 2A, 2B, and 2C are aberration charts of the zoom lens according to the first exemplary embodiment at the wide-angle end, the middle zoom position, and the telephoto end (long focal length end), respectively. FIGS. 3A and 3B are lateral aberration charts of the zoom lens according to the first exemplary embodiment at the wide-angle end and the telephoto end, respectively, after image displacement by 0.3°. The first exemplary embodiment relates to a zoom lens having a zoom ratio of 9.59 and an aperture ratio (F-number) of 1.85 to 3.00.

Figure 4:
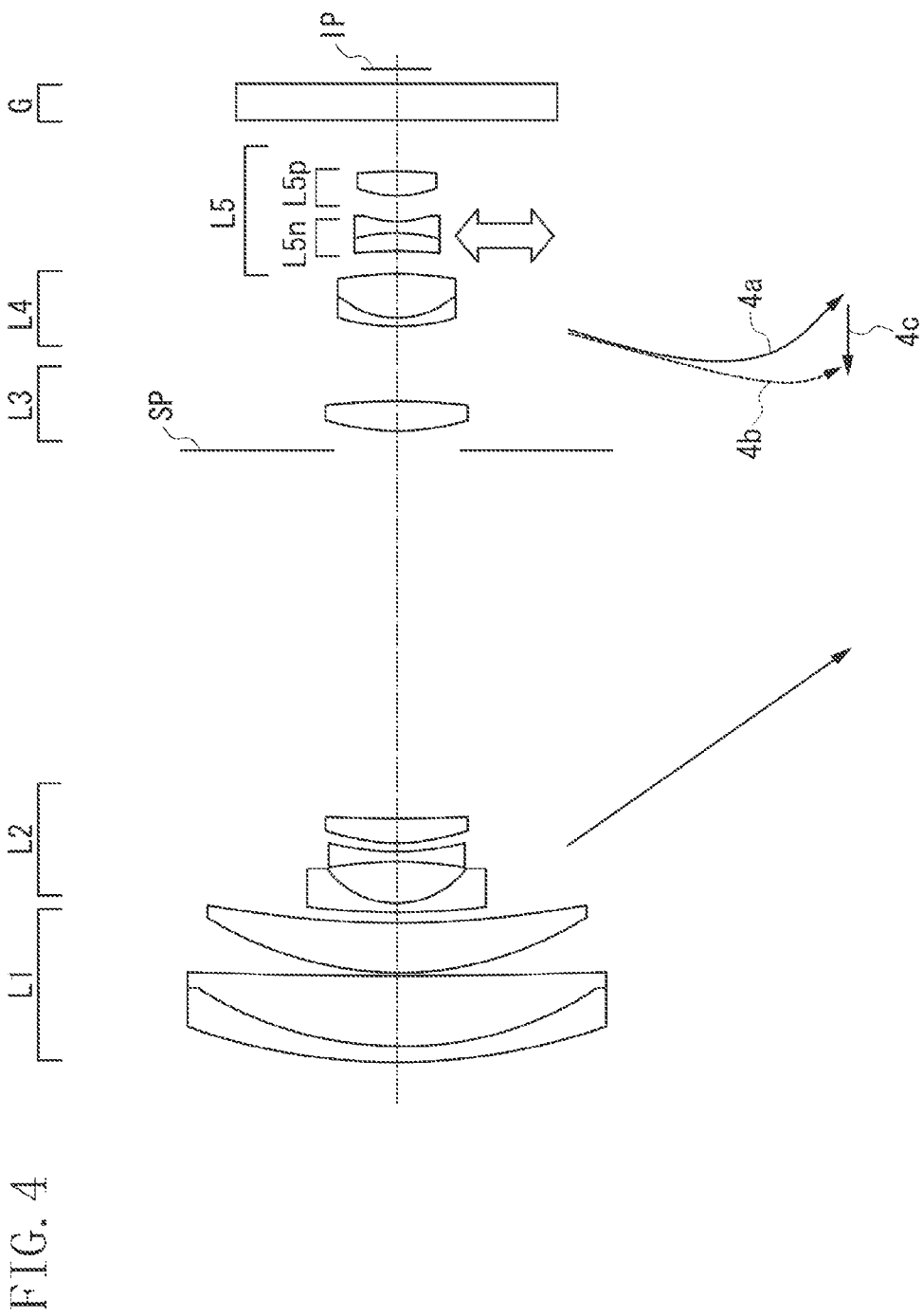
FIG. 4 is a lens cross-sectional view illustrating a zoom lens according to a second exemplary embodiment of the invention at the wide-angle end.

FIG. 4 is a lens cross-sectional view illustrating the zoom lens according to the second exemplary embodiment of the invention at the wide-angle end. FIGS. 5A, 5B, and 5C are aberration charts of the zoom lens according to the second exemplary embodiment at the wide-angle end, the middle zoom position, and the telephoto end, respectively. FIGS. 6A and 6B are lateral aberration charts of the zoom lens according to the second exemplary embodiment at the wide-angle end and the telephoto end, respectively, after image displacement by 0.3°. The second exemplary embodiment relates to a zoom lens having a zoom ratio of 13.95 and an aperture ratio of 1.85 to 3.30.

Figure 7:
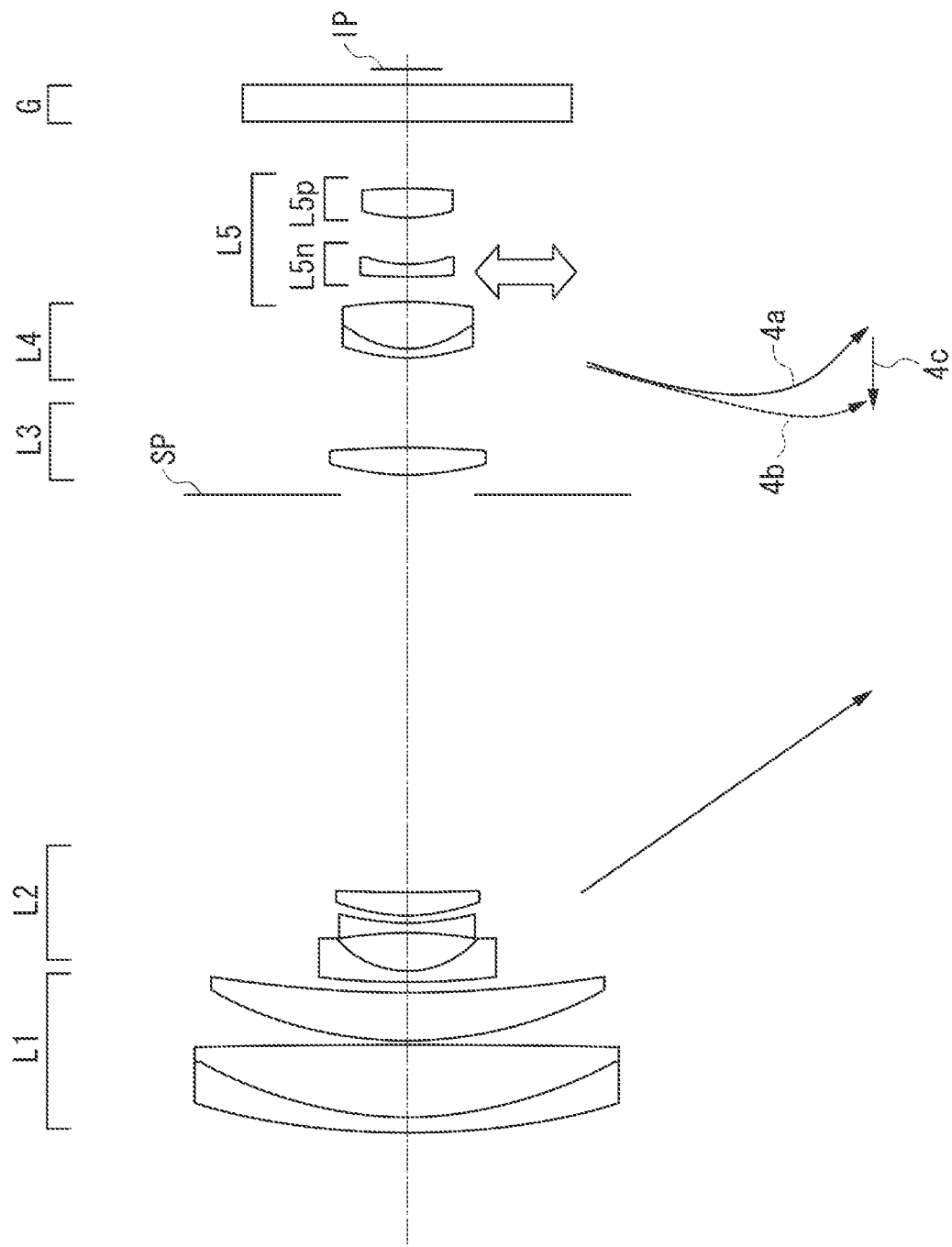
FIG. 7 is a lens cross-sectional view illustrating a zoom lens according to a third exemplary embodiment of the invention at the wide-angle end.
Figure 8A:
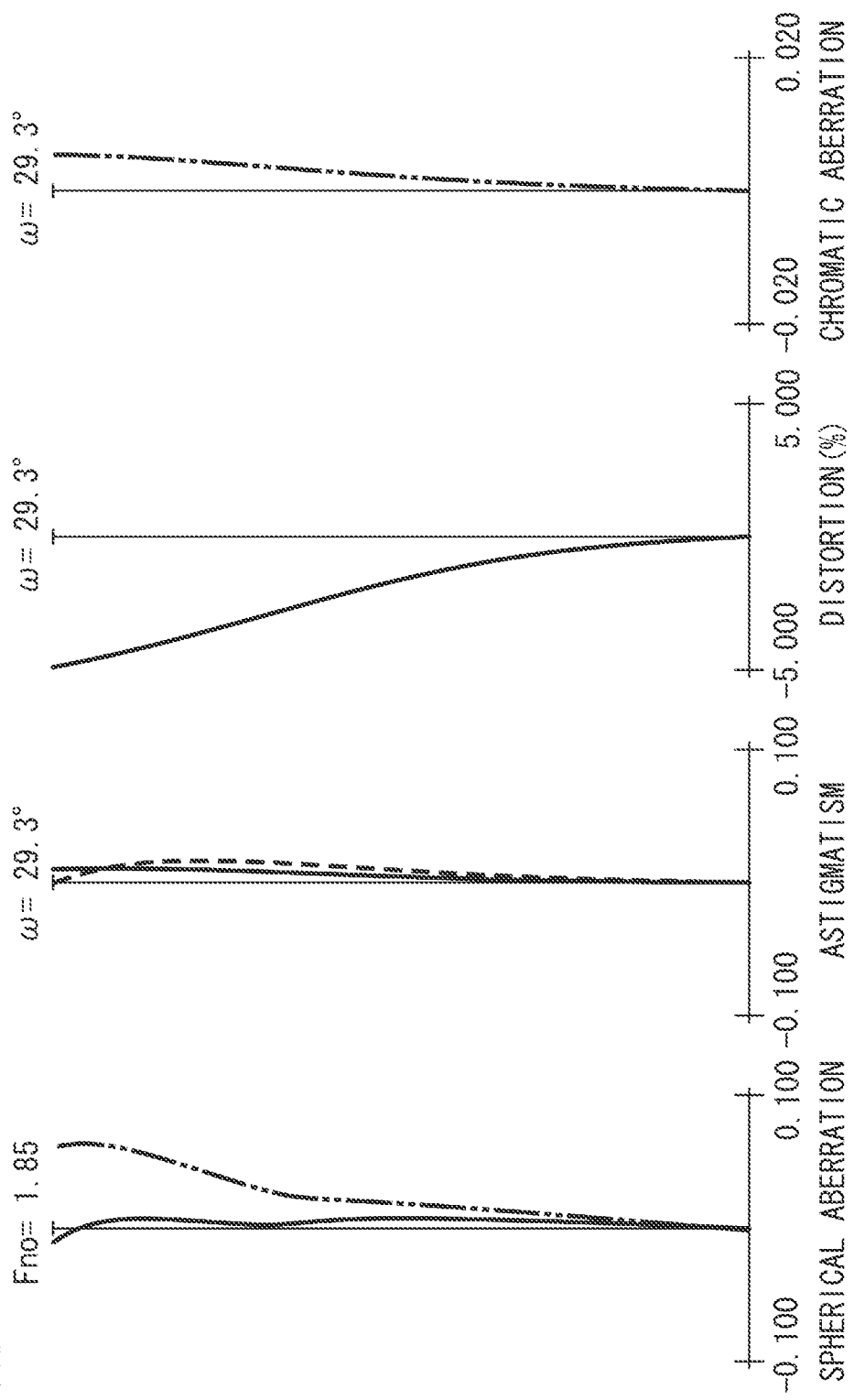
Figure 8C:
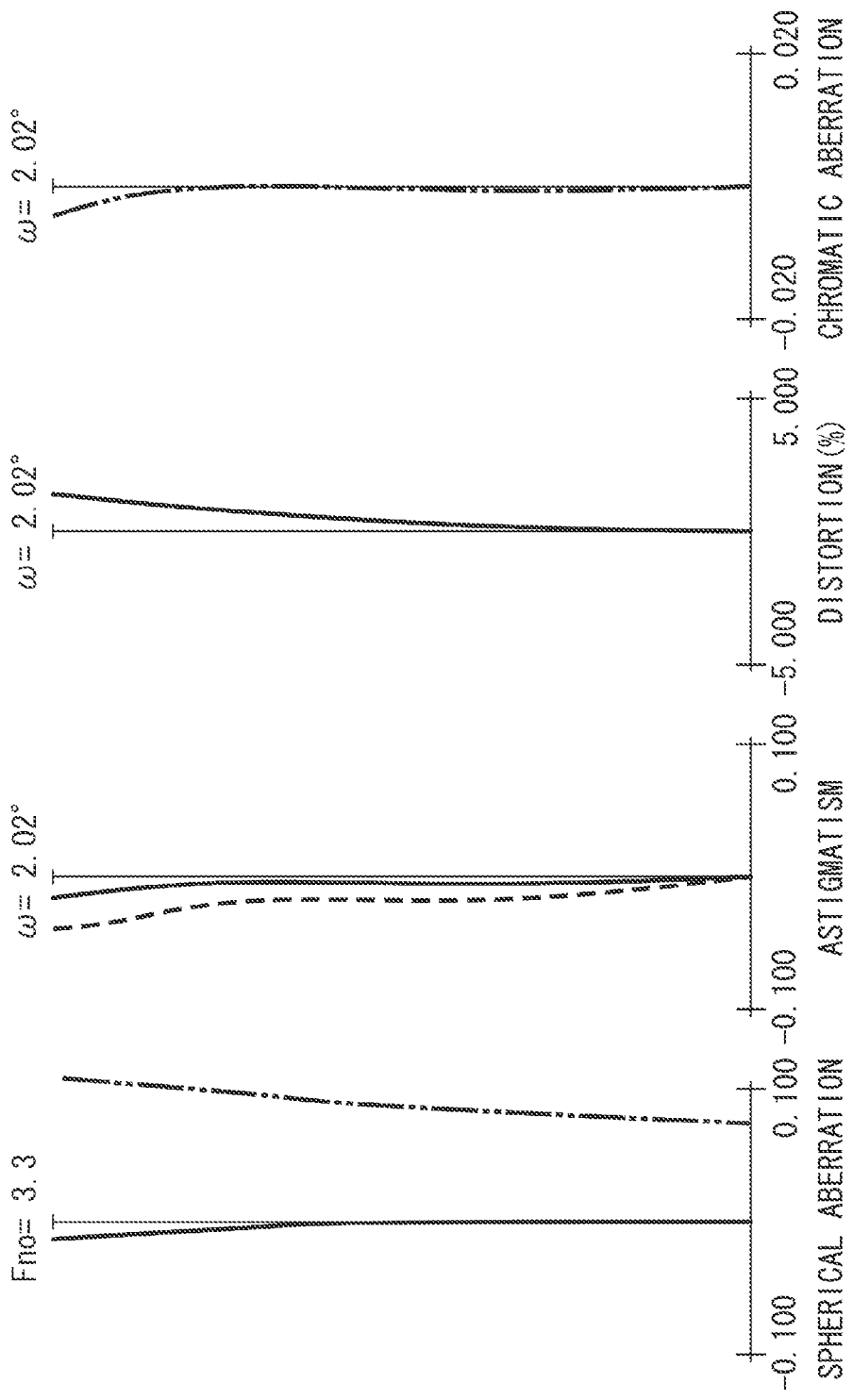
Figure 9B:
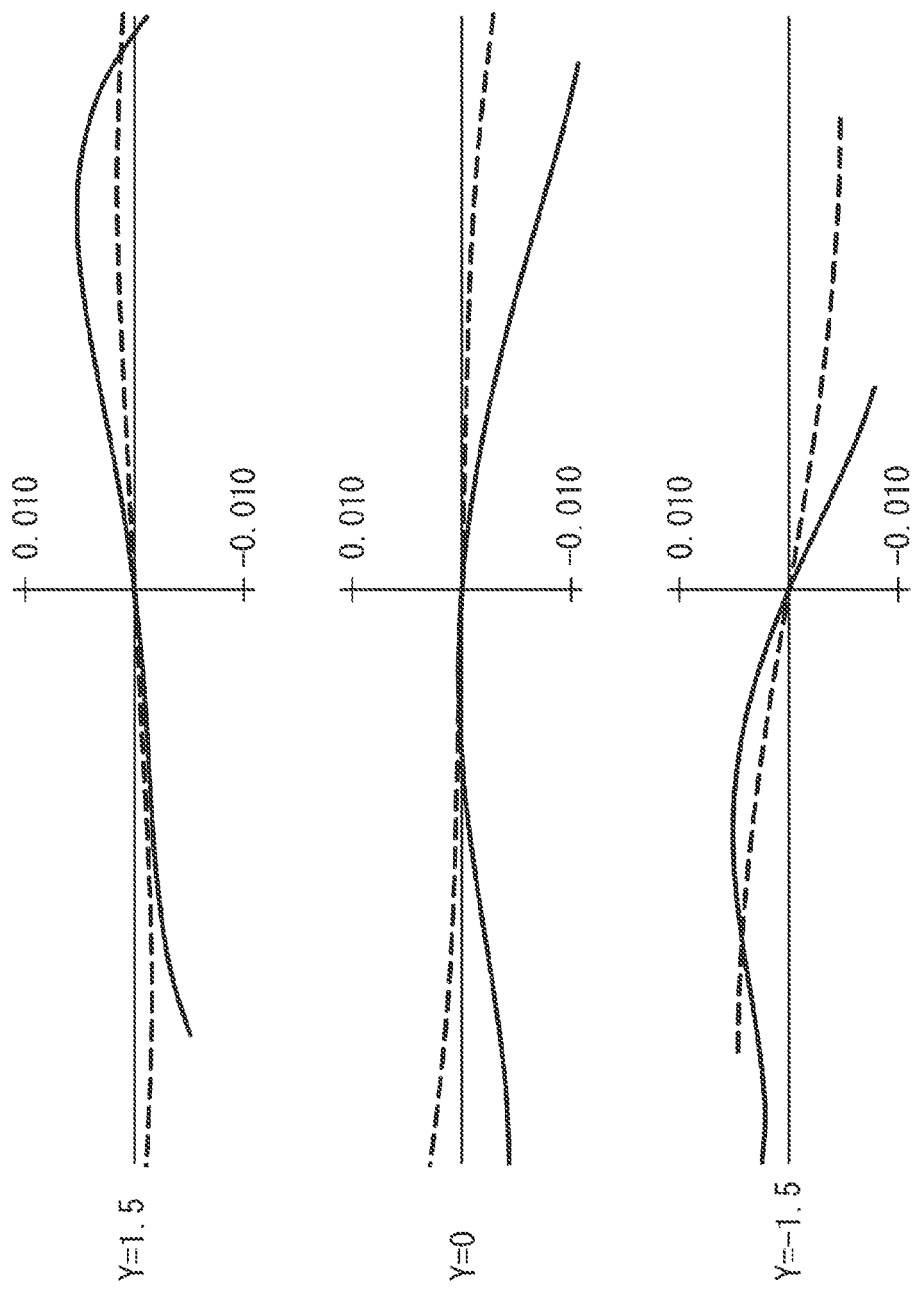
Figure 10:
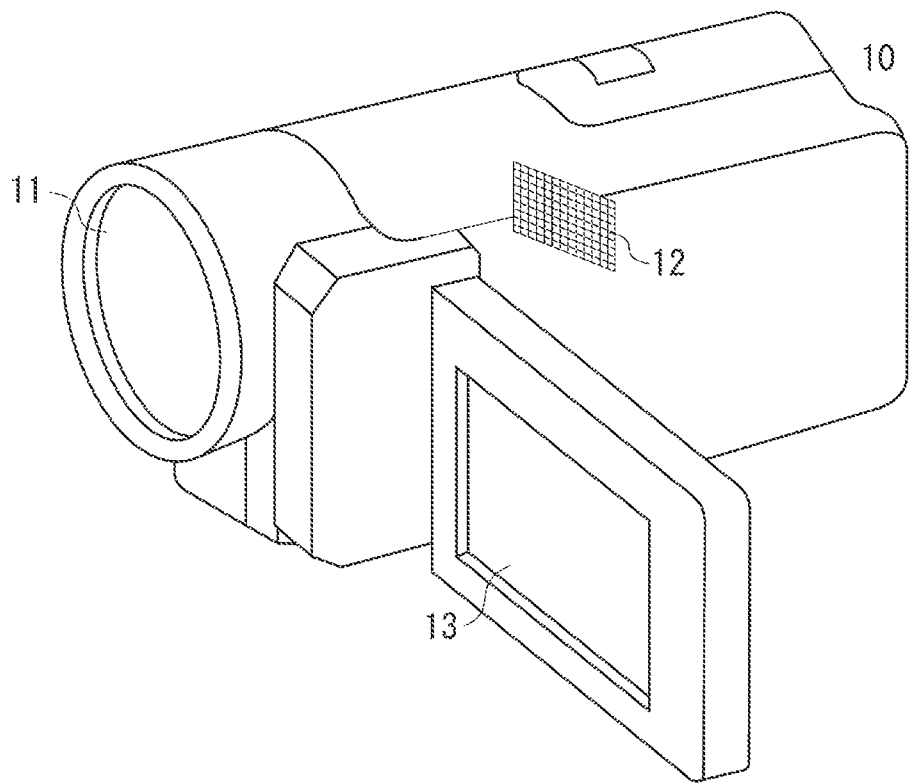
FIG. 10 is a schematic diagram illustrating main parts of an image pickup apparatus according to an exemplary embodiment of the invention.
Figure 11:
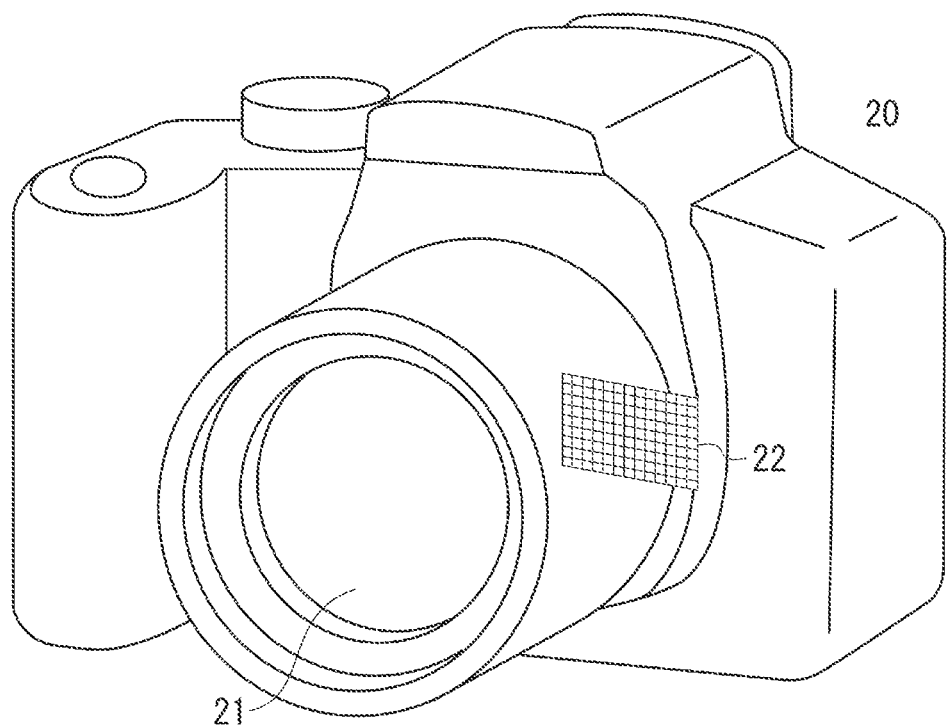
FIG. 11 is a schematic diagram illustrating main parts of an image pickup apparatus according to an exemplary embodiment of the invention.

FIG. 7 is a lens cross-sectional view illustrating the zoom lens according to the third exemplary embodiment of the invention at the wide-angle end. FIGS. 8A, 8B, and 8C are aberration charts of the zoom lens according to the third exemplary embodiment at the wide-angle end, the middle zoom position, and the telephoto end, respectively. FIGS. 9A and 9B are lateral aberration charts of the zoom lens according to the third exemplary embodiment at the wide-angle end and the telephoto end, respectively, after image displacement by 0.3°. The third exemplary embodiment relates to a zoom lens having a zoom ratio of 15.90 and an aperture ratio of 1.85 to 3.30. FIGS. 10 and 11 are schematic diagrams each illustrating main parts of an image pickup apparatus according to an exemplary embodiment of the invention.

The zoom lens according to an exemplary embodiment of the invention is used in an image pickup apparatus such as a digital camera, a video camera, and a silver-halide film camera. In the lens cross-sectional view, the left side refers to the front side (object side or enlargement side), and the right side refers to the rear side (image side or reduction side). In the lens cross-sectional view, i denotes the order of the lens units from the object side to the image side, and Li denotes the i-th lens unit.

Next, characteristics of the zoom lens according to each exemplary embodiment will be described. In the lens cross-sectional views of each exemplary embodiment, the first lens unit L1 has a positive refractive power (optical power=inverse of focal length), the second lens unit L2 has a negative refractive power, the third lens unit L3 has a positive refractive power, the fourth lens unit L4 has a negative refractive power, and the fifth lens unit L5 has a positive or negative refractive power.

The fifth lens unit L5 includes a first lens subunit L5n of a negative refractive power, which is moved to have a component perpendicular to an optical axis and displace the image position (image-forming position) in the optical axis direction, and a second lens subunit L5p of a positive refractive power, which is stationary. An F-number determining member (hereinafter, referred to as an "aperture stop") SP is located on the object side of the third lens unit L3 to serve as an aperture stop for determining (restricting) a full-aperture F-number (Fno) light flux.

The optical block G includes an optical filter, a phase plate, a crystal low-pass filter, an infrared cut-off filter, or the like. The image plane IP corresponds to an imaging surface of an image sensor (photoelectric conversion element) such as a CCD sensor or a CMOS sensor when it is used in a photographic optical system of a video camera or a digital camera. In addition, the image plane IP corresponds to a photo-sensing surface such as a film surface when it is used in a photographic optical system of a silver-halide film camera.

In the spherical aberration charts out of the aberration charts, the solid line denotes d-line, and a two-dotted dashed line denotes g-line. In the astigmatism charts, the dotted line denotes a meridional image plane, and the solid line denotes a sagittal image plane. Chromatic aberration of magnification is represented by g-line. In the lateral aberration charts, Y denotes an image height, the solid line denotes lateral aberration of a d-line meridional cross-section, and the dotted line denotes lateral aberration of a d-line sagittal cross-section. Fno denotes an F-number, and ω denotes a half angle of view (degree). In the lens cross-sectional views, the arrows denote movement loci of each lens unit during zooming from the wide-angle end to the telephoto end. The second and fourth lens units L2 and L4 are moved during zooming. In this case, a distance between the first and second lens units increases at the telephoto end in comparison with the wide-angle end.

In each exemplary embodiment described below, the wide-angle end and the telephoto end refer to zoom positions when the zoom lens unit is positioned in respective ends within the movable range on an optical axis of a mechanism. In each exemplary embodiment, zooming is performed by moving the second lens unit L2 towards the image side as indicated by the arrows during zooming from the wide-angle end to the telephoto end. In addition, an image plane variation caused by zooming is corrected by moving the fourth lens unit L4 with a locus that is convex towards the object side.

In addition, focusing is performed by employing a rear focus type in which the fourth lens unit L4 is moved along the optical axis. The solid line curve 4a and the dotted line curve 4b for the fourth lens unit L4 represent movement loci for correcting the image plane variation caused by zooming when focusing is performed for an infinitely-distant object and a close object, respectively. In this manner, a space between the third and fourth lens units L3 and L4 is effectively used by moving the fourth lens unit L4 with a locus that is convex towards the object side. Therefore, it is possible to effectively reduce the entire lens length (a distance from the first lens surface to the image plane).

In addition, at the telephoto end, focusing from an infinitely-distant object to a close object is performed by moving the fourth lens unit L4 forward (towards the object side) as indicated by the arrow 4c. The image-forming position is moved in a direction perpendicular to an optical axis by moving the first lens subunit L5n to have a component perpendicular to an optical axis. That is, image stabilization is performed in this manner. The aperture stop SP is stationary.

The zoom lens according to the exemplary embodiment of the invention includes first to fourth lens unit L1 to L4 of positive, negative, positive, positive refractive powers and a fifth lens unit L5 in order from an object side to an image side to obtain a high zoom ratio. In addition, the second and fourth lens units L2 and L4 are moved during zooming. As a result, it is possible to obtain a zoom lens having a small size in entirety with a high zoom ratio. A first lens subunit L5n of a negative refractive power is provided in the fifth lens unit L5 to miniaturize the correction lens unit for image shake correction with a light weight. As a result, it is possible to achieve miniaturization of the entire zoom lens while an image shake correction function is provided.

In each exemplary embodiment, where a lateral magnification of the first lens subunit L5n is set to β5n, and a lateral magnification of the second lens subunit L5p located on the image side of the first lens subunit L5n is set to β5p, the following condition is satisfied.

$$0.5 < |(1-\beta 5n) \times \beta 5p| < 2.0 \quad (1)$$

In each exemplary embodiment, in order to appropriately correct various types of aberration across the entire zoom range while a predetermined zoom ratio is obtained, the zoom lens includes first to fourth lens units L1 to L4 of positive, negative, positive, and positive refractive powers and a fifth lens unit in order from an object side to an image side. Since the zoom lens according to the exemplary embodiment of the invention has a five-unit lens configuration in this manner, it is possible to facilitate correction of spherical aberration or coma generated in the first and second lens units L1 and L2.

In order to obtain miniaturization of the entire zoom lens and a high zoom ratio, the second and fourth lens units L2 and L4 are moved during zooming. In this case, a distance between the first and second lens units L1 and L2 increases at the telephoto end in comparison with the wide-angle end. In addition, a first lens sub-unit L5n of a negative refractive power is provided in the fifth lens unit L5, so that various types of aberration generated in the second lens subunit L5p of a positive refractive power in the fifth lens unit L5 is cancelled (corrected) by the negative refractive effect thereof.

In addition, since the first lens subunit L5n of a negative refractive power is moved to have a component perpendicular to an optical axis, the image shake generated when the zoom lens is vibrated is corrected using a slight movement amount.

The condition (1) is to define image shift sensitivity at the time of image stabilization of the first lens subunit L5n of a negative refractive power in the fifth lens unit L5. Here, the image shift sensitivity TS refers to a ratio between a movement amount ΔL of a shift lens unit when the shift lens unit is moved in a direction perpendicular to the optical axis and a movement amount ΔI of an image in a direction perpendicular to the optical axis on an image plane.

$$TS = \Delta I / \Delta L$$

If the upper limit of the condition (1) is exceeded, the image is significantly shifted for a slight movement of the first lens subunit L5n, so that it is necessary to control image shift with high precision, which is not desirable. If the lower limit of the condition (1) is exceeded, the movement amount of the first lens subunit L5n necessary to shift the image by a predetermined amount increases, so that it is difficult to miniaturize the entire zoom lens. In addition, it is difficult to suppress an aberration variation when the first lens subunit L5n is shifted to shift the image by a predetermined amount.

In each exemplary embodiment, it is useful that at least one of the following conditions be satisfied:

$$0.5 < |f5n/f5p| < 2.0 \quad (2),$$

$$0.01 < |f5n/f5| < 0.30 \quad (3),$$

$$0.5 < f3/f4 < 2.0 \quad (4),$$

$$5.0 < ft/|f2| < 25.0 \quad (5), \text{ and}$$

$$1.0 < |f5|/\sqrt{(fw \times ft)}| < 50.0 \quad (6),$$

where the fifth lens unit L5 includes a first lens subunit L5n of a negative refractive power and a second lens subunit L5p of a positive refractive power in order from the object side to the image side, f5n and f5p denote focal lengths of the lens subunits L5n and L5p, respectively, f2, f3, f4, and f5 denote focal lengths of the second, third, fourth, and fifth lens units L2, L3, L4, and L5, respectively, and fw and ft denote focal lengths of the entire zoom lens at the wide-angle end and the telephoto end, respectively.

In each exemplary embodiment, image shake correction is performed using the first lens subunit L5n of a negative refractive power in the fifth lens unit L5 to allow the correction lens unit (shift lens unit) for image shake correction to have a small size and a light weight. In order to minimize a configuration of the correction lens unit, the fifth lens unit L5 usefully includes two lens units, i.e., a first lens subunit L5n of a negative refractive power and a second lens subunit L5p of a positive refractive power.

In addition, the fifth lens unit L5 usefully includes a first lens subunit L5n of a negative refractive power and a second lens subunit L5p of a positive refractive power in order from the object side to the image side.

The condition (2) is to define a focal length of the first lens subunit L5n of a negative refractive power and a focal length of the second lens subunit L5p of a positive refractive power in the fifth lens unit L5. If the upper limit of the condition (2) is exceeded, the focal length (absolute value) of the first lens subunit L5n increases, so that it is difficult to suppress a slope of the image plane or decentering coma at the time of image shake correction.

If the lower limit of the condition (2) is exceeded, the focal length of the first lens subunit L5n decreases, and pincushion type distortion is generated significantly, so that it is necessary to correct such distortion using the second lens subunit L5p. As a result, the size of the second lens subunit L5p increases, which is not useful. In addition, it is difficult to suppress a variation in various types of aberration when the first lens subunit L5n is shifted to shift the image by a predetermined amount.

The condition (3) is to define the focal length of the first lens subunit L5n of the fifth lens unit L5 using the focal length of the fifth lens unit L5. If the upper limit of the condition (3) is exceeded, the focal length of the fifth lens unit L5 decreases, so that it is difficult to obtain a high zoom ratio while excellent aberration correction is performed for the entire zoom range. If the lower limit of the condition (3) is exceeded, the focal length of the first lens subunit L5n decreases, and the focus sensitivity of the fourth lens unit L4 excessively increases, which is not useful. In addition, the aberration variation increases due to a manufacturing error, which is not useful.

The condition (4) is to define the focal length of the third lens unit L3 using the focal length of the fourth lens unit L4. If the upper limit of the condition (4) is exceeded, the focal length of the fourth lens unit L4 decreases, so that it is necessary to increase the number of lenses of the fourth lens unit L4 to appropriately correct aberration. As a result, the entire lens length increases, which is not useful. If the focal length of the fourth lens unit L4 excessively increases with the lower limit of the condition (4) exceeded, the movement amount for correcting the image plane variation during zooming or the movement amount for focusing increases, and the entire lens length increases, which is not useful.

The condition (5) is to define the focal length of the entire zoom lens at the telephoto end using the focal length of the second lens unit L2. If the focal length of the second lens unit L2 decreases with the upper limit of the condition (5) exceeded, it is advantageous to obtain a high zoom ratio and reduce the entire lens length. However, the Petzval sum increases in a negative direction, and curvature of field increases, which is not useful.

If the focal length of the second lens unit L2 increases with the lower limit of the condition (5) exceeded, it is necessary to increase the movement amount of the second lens unit L2 for a high zoom ratio. Alternatively, it is necessary to increase the zoom effect in the rear-side (image-side) lens unit relative to the second lens unit L2. If the movement amount of the second lens unit L2 increases, the entire lens length increases, which is not useful. In addition, if the zoom effect of the lens unit located in the rear side relative to the second lens unit L2 increases, the length of the entire zoom lens increases, and the number of lenses increase, which is not useful.

The condition (6) is to define the focal length of the fifth lens unit L5 using the focal lengths of the entire zoom lens at the wide-angle end and the telephoto end. If the focal length of the fifth lens unit L5 increases with the upper limit of the condition (6) exceeded, the back focus excessively increases, and the entire lens length increases, which is not useful. If the focal length of the fifth lens unit L5 decreases with the lower limit of the condition (6) exceeded, a variation in the incident angle of the off-axial light flux on the image plane during zooming increases, which is not useful. More usefully, the numerical ranges of the conditions (1) to (6) are set as follows:

$$0.6<|(1-\beta 5n)\times \beta 5p|<1.6 \tag{1a}$$

$$0.5<|f5n/f5p|<1.6 \tag{2a}$$

$$0.02<|f5n/f5|<0.20 \tag{3a}$$

$$0.6<f3/f4<1.6 \tag{4a}$$

$$5.8<ft/|f2|<15.0 \tag{5a}$$

$$3.0<|f5/\sqrt{(fw\times ft)}|<40.0 \tag{6a}$$

More usefully, the numerical ranges of the conditions (1a) to (6a) can set as follows:

$$0.6<|(1-\beta 5n)\times \beta 5p|<1.2 \tag{1b}$$

$$0.5<|f5n/f5p|<1.2 \tag{2b}$$

$$0.03<|f5n/f5|<0.10 \tag{3b}$$

$$0.7<f3/f4<1.4 \tag{4b}$$

$$6.3<ft/|f2|<10.0 \tag{5b}$$

$$5.0<|f5/\sqrt{(fw\times ft)}|<30.0 \tag{6b}$$

In each exemplary embodiment, it is useful that the fifth lens unit L5 does not move for zooming.

In order to perform image shake correction along with zooming, high precision control is necessary to suppress image shake during zooming when the correction lens unit is moved in the optical axis direction. As a result, a driving mechanism becomes large-sized and complicated, which is not useful. In addition, it is useful that the first lens subunit L5n includes a single component (single lens or cemented lens) to simplify a shift mechanism.

An actuator for moving the aperture stop SP is dispensable when the aperture stop SP is fixed (stationary) with respect to the image-forming surface (image plane) during zooming. As a result, a configuration of the aperture stop is simplified, which is useful. It is useful that the first and third lens units L1 and L3 be fixed during zooming, and two movable lens units be used for zooming. As a result, it is possible to prevent a change of the entire lens length during zooming, which is useful. In addition, it is useful that the third lens unit L3 has at least one aspheric surface. As a result, it is possible to relatively reduce the F-number at the wide-angle end and easily configure the succeeding lens units using a simple structure.

As described above, in each exemplary embodiment, it is possible to appropriately correct various types of aberration such as spherical aberration or coma. In addition, it is possible to implement a zoom lens capable of appropriately correcting an aberration variation during the image shake correction while the correction lens unit for image shake correction has a small size and a light weight.

Next, configurations of each lens unit according to each exemplary embodiment of the invention will be described.

Hereinafter, unless specified otherwise, description will be made in a sequence from the object side to the image side. The first lens unit L1 includes a cemented lens, obtained by cementing negative and positive lenses, and a positive lens having a meniscus shape in which the object-side surface is convex. In the zoom lens of each exemplary embodiment, the refractive power of the first lens unit L1 increases to obtain a small size and a high zoom ratio. In this case, various types of aberration generated in the first lens unit L1 such as, particularly, spherical aberration at the wide-angle end are generated significantly. In this regard, generation of such various types of aberration is reduced by sharing a contribution of the positive refractive power of the first lens unit L1 between the cemented lens and the positive lens.

The second lens unit L2 includes a negative lens having a concave image-side lens surface, in which an absolute value of the refractive index is stronger on the image side in comparison with the object side, a bi-concave negative lens, and a positive lens having a convex object-side lens surface. In the zoom lens of each exemplary embodiment, the refractive power of the second lens unit L2 is strengthened to reduce an effective diameter of the first lens unit L1 while a wide angle of view is obtained at the wide-angle end.

In this case, various types of aberration generated in the second lens unit L2 such as, particularly, curvature of field at the wide-angle side increases significantly. In each exemplary embodiment, generation of such various types of aberration is reduced by sharing a contribution of the negative refractive power of the second lens unit L2 between two negative lenses. In such a lens configuration, it is possible to obtain a wide angle of view and excellent optical performance and reduce a front lens effective diameter.

The third lens unit L3 includes a single positive lens having a convex object-side lens surface. In addition, at least one of the lens surfaces of the third lens unit L3 has an aspheric shape. The fourth lens unit L4 includes a cemented lens obtained by cementing positive and negative lenses. In each exemplary embodiment, since the fourth lens unit L4 includes a small number of lenses, it is possible to reduce a thickness and obtain a light weight. The first lens subunit L5n of the fifth lens unit L5 includes a cemented lens obtained by cementing positive and negative lenses or a single negative lens. Thus, the first lens subunit L5n of the fifth lens unit L5 includes a single component. The second lens subunit L5p includes a single positive lens.

In each exemplary embodiment, since each lens unit is configured as described above, it is possible to obtain a zoom lens having excellent optical performance across the entire zoom range and the entire object length while the entire zoom lens is miniaturized with a high zoom ratio. In addition, since a mechanism for image stabilization is provided, it is possible to obtain a zoom lens having an image stabilizing function capable of obtaining an excellent image during image stabilization.

Next, a camcorder (video camera) and a digital camera in which a zoom lens according to an exemplary embodiment of the invention is used as a photographic optical system will be described with reference to FIGS. 10 and 11, respectively. In FIG. 10, reference numeral 10 denotes a camera body, and reference numeral 11 denotes a photographic optical system including any one of the zoom lenses according to the first to third exemplary embodiments of the invention. Reference numeral 12 denotes a solid-state image sensor (photoelectric conversion element) such as a CCD sensor or a CMOS sensor, which is mounted in the camera body 10, to receive an object image formed by the photographic optical system 11.

Reference numeral 13 denotes a viewfinder including a liquid crystal display panel and the like to observe an object image formed on the solid-state image sensor 12. In FIG. 11, reference numeral 20 denotes a camera body, and reference numeral 21 denotes a photographic optical system including any one of the zoom lenses according to the first to third exemplary embodiments of the invention. Reference numeral 22 denotes a solid-state image sensor (photoelectric conversion element) such as a CCD sensor or a CMOS sensor, which is mounted in the camera body 20, to receive an object image formed by the photographic optical system 21. The zoom lens of each exemplary embodiment may be used as a projection optical system for a projector.

Next, Numerical Examples 1 to 3 corresponding to the first to third exemplary embodiments of the invention will be described. In each numerical example, i denotes the order of a surface counted from the object side, ri denotes a radius of curvature of the i-th surface from the object side, di denotes a lens thickness or an air distance between the i-th surface and the (i+1)th surface in order from the object side, and ndi and vdi denote a refractive index and an Abbe number, respectively, of a material of the i-th optical member in order from the object side. In addition, two surfaces closest to the image side constitute a glass material such as a phase plate.

An aspheric shape can be expressed as follows:

$$X = \frac{\frac{H^2}{R}}{1+\sqrt{1-(1+K)\left(\frac{H}{R}\right)^2}} + A4H^4 + A6H^6 + A8H^8 + A10H^{10}$$

where it is assumed that the X-axis denotes the optical axis direction, the H-axis denotes a direction perpendicular to the optical axis direction, the light propagation direction is set to be positive, R denotes a paraxial radius of curvature, k denotes a conic constant, and A4, A6, A8, and A10 denote aspheric coefficients.

Here, the asterisk * denotes a surface having an aspheric shape. "e-x" means "$10^{-x}$." BF denotes a back focus represented by an air-equivalent length from the last lens surface to the image plane.

Numerical Example 1

| Unit: mm | | | | |
|---|---|---|---|---|
| Surface data | | | | |
| Surface number | r | d | nd | vd |
| 1 | 39.999 | 1.00 | 1.84666 | 23.9 |
| 2 | 22.257 | 4.14 | 1.60311 | 60.6 |
| 3 | 844.327 | 0.18 | | |
| 4 | 19.713 | 2.98 | 1.69680 | 55.5 |
| 5 | 49.749 | (Variable) | | |
| 6 | 52.237 | 0.65 | 1.88300 | 40.8 |
| 7 | 5.569 | 2.18 | | |
| 8 | −21.602 | 0.60 | 1.83481 | 42.7 |
| 9 | 14.743 | 0.94 | | |
| 10 | 12.950 | 1.46 | 1.92286 | 18.9 |
| 11 | 299.674 | (Variable) | | |
| 12 (Stop) | ∞ | 1.30 | | |
| 13* | 14.870 | 2.01 | 1.58313 | 59.4 |
| 14* | −24.047 | (Variable) | | |
| 15 | 14.314 | 0.60 | 1.80518 | 25.4 |

-continued

Unit: mm

| | | | | |
|---|---|---|---|---|
| 16 | 5.627 | 2.68 | 1.62299 | 58.2 |
| 17 | −18.970 | (Variable) | | |
| 18 | −27.676 | 0.77 | 1.76182 | 26.5 |
| 19 | −24.356 | 0.70 | 1.51742 | 52.4 |
| 20 | 7.091 | 1.27 | | |
| 21 | 11.738 | 1.73 | 1.48749 | 70.2 |
| 22 | −11.985 | 4.36 | | |
| 23 | ∞ | 2.00 | 1.51633 | 64.1 |
| 24 | ∞ | 1.00 | | |
| Image plane | ∞ | | | |

Aspheric data

13th surface

K = −1.88255e+000 A4 = −3.54749e−005 A6 = −1.13871e−006
8 = −1.15135e−007 A10 = 3.04677e−009
14th surface K = 0.00000e+000 A4 = 7.70626e−005 A6 = −2.85358e−006

Various data
Zoom ratio 9.59

| | Wide angle | Middle | Telephoto |
|---|---|---|---|
| Focal length | 4.23 | 27.34 | 40.59 |
| F-number | 1.85 | 2.86 | 3.00 |
| Half angle of view | 28.00 | 4.71 | 3.17 |
| Image height | 2.25 | 2.25 | 2.25 |
| Entire lens length | 58.71 | 58.71 | 58.71 |
| BF | 6.68 | 6.68 | 6.68 |
| d5 | 0.70 | 16.89 | 19.10 |
| d11 | 19.90 | 3.71 | 1.50 |
| d14 | 4.76 | 2.34 | 3.69 |
| d17 | 1.48 | 3.90 | 2.55 |

Zoom lens unit data

| Unit | Starting surface | Focal length |
|---|---|---|
| 1 | 1 | 32.03 |
| 2 | 6 | −6.31 |
| 3 | 12 | 16.06 |
| 4 | 15 | 18.06 |
| 5 | 18 | −10.89 |
| 6 | 21 | 12.46 |
| 7 | 23 | ∞ |

Numerical Example 2

Unit: mm

Surface data

| Surface number | r | d | nd | vd |
|---|---|---|---|---|
| 1 | 42.566 | 1.00 | 1.84666 | 23.9 |
| 2 | 24.189 | 4.73 | 1.60311 | 60.6 |
| 3 | 523.227 | 0.18 | | |
| 4 | 23.631 | 3.22 | 1.69680 | 55.5 |
| 5 | 63.993 | (Variable) | | |
| 6 | 47.618 | 0.65 | 1.88300 | 40.8 |
| 7 | 5.763 | 2.78 | | |
| 8 | −21.692 | 0.60 | 1.80400 | 46.6 |
| 9 | 17.320 | 0.56 | | |
| 10 | 12.571 | 1.60 | 1.92286 | 18.9 |
| 11 | 89.965 | (Variable) | | |
| 12 (Stop) | ∞ | 1.30 | | |
| 13* | 15.147 | 1.98 | 1.58313 | 59.4 |
| 14* | −29.825 | (Variable) | | |
| 15 | 12.201 | 0.60 | 1.80518 | 25.4 |
| 16 | 5.620 | 2.91 | 1.60311 | 60.6 |

-continued

Unit: mm

| | | | | |
|---|---|---|---|---|
| 17 | −19.650 | (Variable) | | |
| 18 | −61.550 | 1.20 | 1.76182 | 26.5 |
| 19 | −9.573 | 0.70 | 1.60342 | 38.0 |
| 20 | 6.103 | 1.78 | | |
| 21 | 8.206 | 1.59 | 1.48749 | 70.2 |
| 22 | −33.399 | 3.38 | | |
| 23 | ∞ | 2.40 | 1.51633 | 64.1 |
| 24 | ∞ | 1.00 | | |
| Image plane | ∞ | | | |

Aspheric data

13th surface

K = −1.84777e+000 A4 = −3.23296e−005 A6 = 1.50941e−006
A8 = −6.12486e−008 A10 = 1.44897e−009
14th surface K = 0.00000e+000 A4 = 6.55147e−005 A6 = 5.16504e−007

Various data
Zoom ratio 13.95

| | Wide angle | Middle | Telephoto |
|---|---|---|---|
| Focal length | 3.99 | 33.80 | 55.68 |
| F-number | 1.85 | 2.90 | 3.30 |
| Half angle of view | 29.42 | 3.81 | 2.31 |
| Image height | 2.25 | 2.25 | 2.25 |
| Entire lens length | 64.74 | 64.74 | 64.74 |
| BF | 5.96 | 5.96 | 5.96 |
| d5 | 0.70 | 20.80 | 23.54 |
| d11 | 24.34 | 4.24 | 1.50 |
| d14 | 4.86 | 2.50 | 4.73 |
| d17 | 1.48 | 3.84 | 1.61 |

Zoom lens unit data

| Unit | Starting surface | Focal length |
|---|---|---|
| 1 | 1 | 36.48 |
| 2 | 6 | −6.55 |
| 3 | 12 | 17.51 |
| 4 | 15 | 16.91 |
| 5 | 18 | −10.50 |
| 6 | 21 | 13.68 |
| 7 | 23 | ∞ |

Numerical Example 3

Unit: mm

Surface data

| Surface number | r | d | nd | vd |
|---|---|---|---|---|
| 1 | 52.181 | 1.00 | 1.84666 | 23.9 |
| 2 | 26.676 | 4.70 | 1.60311 | 60.6 |
| 3 | −544.079 | 0.18 | | |
| 4 | 24.920 | 3.12 | 1.72916 | 54.7 |
| 5 | 68.982 | (Variable) | | |
| 6 | 62.312 | 0.65 | 1.88300 | 40.8 |
| 7 | 5.847 | 2.56 | | |
| 8 | −21.650 | 0.60 | 1.80400 | 46.6 |
| 9 | 17.646 | 0.44 | | |
| 10 | 12.073 | 1.54 | 1.92286 | 18.9 |
| 11 | 73.728 | (Variable) | | |
| 12 (Stop) | ∞ | 1.30 | | |
| 13* | 18.602 | 1.74 | 1.69350 | 53.2 |
| 14* | −48.847 | (Variable) | | |
| 15 | 12.623 | 0.60 | 1.80518 | 25.4 |
| 16 | 6.184 | 3.02 | 1.60311 | 60.6 |
| 17 | −22.932 | (Variable) | | |

-continued

Unit: mm

| | | | | |
|---|---|---|---|---|
| 18* | 40.075 | 0.80 | 1.66998 | 39.3 |
| 19 | 7.105 | 3.03 | | |
| 20 | 10.719 | 1.86 | 1.60311 | 60.6 |
| 21 | −57.581 | 4.31 | | |
| 22 | ∞ | 2.40 | 1.51633 | 64.1 |
| 23 | ∞ | 1.00 | | |
| Image plane | ∞ | | | |

Aspheric data

13th surface

K = −1.61404e+000 A4 = −1.86633e−005 A6 = 2.55237e−006
A8 = −6.23835e−008 A10 = 1.26776e−009
14th surface K = 0.00000e+000 A4 = 5.10805e−005 A6 = 1.63442e−006
18th surface K = 0.00000e+000 A4 = −3.14074e−006 A6 = 4.19374e−006

Various data
Zoom ratio 15.90

| | Wide angle | Middle | Telephoto |
|---|---|---|---|
| Focal length | 4.00 | 37.98 | 63.66 |
| F-number | 1.85 | 2.90 | 3.30 |
| Half angle of view | 29.34 | 3.39 | 2.02 |
| Image height | 2.25 | 2.25 | 2.25 |
| Entire lens length | 67.75 | 67.75 | 67.75 |
| BF | 6.89 | 6.89 | 6.89 |
| d5 | 0.70 | 21.93 | 24.82 |
| d11 | 25.62 | 4.39 | 1.50 |
| d14 | 5.82 | 2.74 | 5.91 |
| d17 | 1.59 | 4.66 | 1.49 |

Zoom lens unit data

| Unit | Starting surface | Focal length |
|---|---|---|
| 1 | 1 | 36.96 |
| 2 | 6 | −6.48 |
| 3 | 12 | 19.63 |
| 4 | 15 | 17.87 |
| 5 | 18 | −13.02 |
| 6 | 20 | 15.14 |
| 7 | 22 | ∞ |

TABLE 1

| Condition | Example 1 | Example 2 | Example 3 |
|---|---|---|---|
| f1 | 32.03 | 36.48 | 36.96 |
| f2 | −6.31 | −6.55 | −6.48 |
| f3 | 16.06 | 17.51 | 19.63 |
| f4 | 18.06 | 16.91 | 17.87 |
| f5 | 264.69 | −128.82 | 198.39 |
| fw | 4.23 | 3.99 | 4.00 |
| ft | 40.59 | 55.68 | 63.66 |
| f5n | −10.89 | −10.50 | −13.02 |
| f5p | 12.46 | 13.68 | 15.14 |
| (1) $|(1 − \beta 5n) \times \beta 5p|$ | 0.748 | 0.749 | 0.720 |
| (2) $|f5n/f5p|$ | 0.874 | 0.768 | 0.860 |
| (3) $|f5n/f5|$ | 0.041 | 0.082 | 0.066 |
| (4) f3/f4 | 0.889 | 1.035 | 1.099 |
| (5) $ft/|f2|$ | 6.433 | 8.503 | 9.831 |
| (6) $|f5/\sqrt{(fw \times ft)}|$ | 20.194 | 8.643 | 12.428 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-132020 filed Jun. 14, 2011, which is hereby incorporated by reference herein in its entirety.

What is claimed is:

1. A zoom lens comprising, in order from an object side to an image side, a first lens unit of a positive refractive power, a second lens unit of a negative refractive power, a third lens unit of a positive refractive power, a fourth lens unit of a positive refractive power, and a fifth lens unit of a positive or negative refractive power, the second and fourth lens units being moved during zooming, a distance between the first and second lens units increasing at a telephoto end in comparison with a wide-angle end,
   wherein the fifth lens unit includes a first lens subunit of a negative refractive power, and a second lens subunit of a positive refractive power located on the image side of the first lens subunit, the first lens subunit is moved to have a component perpendicular to an optical axis to change an image-forming position, and
   wherein following condition is satisfied:

$$0.5 < |(1 − \beta 5n) \times \beta 5p| < 2.0,$$

where β5n denotes a lateral magnification of the first lens subunit, and β5p denotes a lateral magnification of the second lens subunit.

2. The zoom lens according to claim 1, wherein the fifth lens unit includes, in order from the object side to the image side, the first lens subunit and the second lens subunit, and
   wherein following condition is satisfied:

$$0.5 < |f5n/f5p| < 2.0,$$

where f5n and f5p denote focal lengths of the first lens subunit and the second lens subunit, respectively.

3. The zoom lens according to claim 1, wherein following condition is satisfied:

$$0.01 < |f5n/f5| < 0.30,$$

where f5n and f5 denote focal lengths of the first lens subunit and the fifth lens unit, respectively.

4. The zoom lens according to claim 1, wherein the fifth lens unit does not move for zooming.

5. The zoom lens according to claim 1, wherein the first lens subunit includes a cemented lens, obtained by cementing positive and negative lenses, or a single negative lens.

6. The zoom lens according to claim 1, wherein following condition is satisfied:

$$0.5 < f3/f4 < 2.0,$$

where f3 and f4 denote focal lengths of the third and fourth lens units, respectively.

7. The zoom lens according to claim 1, wherein the first and third lens units do not move for zooming.

8. The zoom lens according to claim 1, wherein following condition is satisfied:

$$5.0 < ft/|f2| < 25.0,$$

where f2 denotes a focal length of the second lens unit, and ft denotes a focal length of the entire zoom lens at the telephoto end.

9. The zoom lens according to claim 1, wherein following condition is satisfied:

$$1.0 < |f5/\sqrt{(fw \times ft)}| < 50.0,$$

where f5 denotes a focal length of the fifth lens unit, and fw and ft denote focal lengths of the entire zoom lens at the wide-angle end and the telephoto end, respectively.

10. An image pickup apparatus comprising the zoom lens according to claim 1 and an image sensor configured to receive an image formed by the zoom lens.

\* \* \* \* \*